(12) United States Patent
Lin et al.

(10) Patent No.: US 7,702,745 B2
(45) Date of Patent: *Apr. 20, 2010

(54) PERSISTENT CACHING DIRECTORY LEVEL SUPPORT

(76) Inventors: Yun Lin, 12012 NE. 100th Pl., Kirkland, WA (US) 98033; Navjot Virk, 14440 NE. 35th St., #G-2, Bellevue, WA (US) 98007; Brian S. Aust, 6110 140th Ct. NE., Redmond, WA (US) 98052; Shishir P. Pardikar, 10823 179th Ct. NE., Redmond, WA (US) 98051; David C. Steere, 9844 NE. 27th St., Bellevue, WA (US) 98004; Mohammed A. Samji, 1805 134th Ave., SE. Unit 31, Bellevue, WA (US) 98005

( * ) Notice: Subject to any disclaimer, the term of this patent is extended or adjusted under 35 U.S.C. 154(b) by 1242 days.

This patent is subject to a terminal disclaimer.

(21) Appl. No.: 11/064,235

(22) Filed: Feb. 22, 2005

(65) Prior Publication Data
US 2005/0160096 A1    Jul. 21, 2005

Related U.S. Application Data

(62) Division of application No. 10/692,212, filed on Oct. 23, 2003, now abandoned.

(51) Int. Cl.
*G06F 15/16* (2006.01)

(52) U.S. Cl. .................... 709/217; 709/203; 709/212; 709/239

(58) Field of Classification Search .............. 709/203, 709/212–217, 227, 239; 707/200, 205
See application file for complete search history.

(56) References Cited

U.S. PATENT DOCUMENTS 5,452,447 A * 9/1995 Nelson et al. ............... 707/205

(Continued)

OTHER PUBLICATIONS

Pilot Program Interview Dated Oct. 3, 2008 for U.S. Appl. No. 11/064,255, 4 pages.

(Continued)

*Primary Examiner*—Phuoc Nguyen
(74) *Attorney, Agent, or Firm*—Workman Nydegger

(57) ABSTRACT

The present invention provides a novel client side caching (CSC) infrastructure that supports transition states at the directory level to facilitate a seamless operation across connectivity states between client and remote server. More specifically, persistent caching is performed to safeguard the user (e.g., client) and/or the client applications across connectivity interruptions and/or bandwidth changes. This is accomplished in part by caching to a client data store the desirable file(s) together with the appropriate file access parameters. Moreover, the client maintains access to cached files during periods of disconnect. Furthermore, portions of a path can be offline while other portions upstream can remain online. CSC operates on the logical path which cooperates with DFS which operates on the physical path to keep track of files cached, accessed and changes in the directories. In addition, truth on the client is facilitated whether or not a conflict of file copies exists.

9 Claims, 12 Drawing Sheets

U.S. PATENT DOCUMENTS

| | | | |
|---|---|---|---|
| 5,561,799 A * | 10/1996 | Khalidi et al. ............... 707/200 |
| 5,867,661 A | 2/1999 | Bittinger et al. |
| 5,878,213 A | 3/1999 | Bittinger et al. |
| 5,907,678 A | 5/1999 | Housel, III et al. |
| 6,003,087 A | 12/1999 | Housel, III et al. |
| 6,018,619 A | 1/2000 | Allard et al. |
| 6,026,474 A | 2/2000 | Carter et al. |
| 6,047,356 A | 4/2000 | Anderson et al. |
| 6,065,043 A * | 5/2000 | Domenikos et al. ......... 709/203 |
| 6,094,684 A * | 7/2000 | Pallmann .................... 709/227 |
| 6,096,096 A | 8/2000 | Murphy et al. |
| 6,119,153 A | 9/2000 | Dujari et al. |
| 6,163,856 A * | 12/2000 | Dion et al. ..................... 714/4 |
| 6,185,601 B1 | 2/2001 | Wolff |
| 6,446,088 B1 | 9/2002 | Vaduvur et al. |
| 6,453,343 B1 | 9/2002 | Housel, III et al. |
| 6,697,849 B1 | 2/2004 | Carlson |
| 6,754,696 B1 * | 6/2004 | Kamath et al. ............... 709/213 |
| 7,409,420 B2 * | 8/2008 | Pullara et al. ................ 709/203 |
| 2002/0078142 A1 | 6/2002 | Moore et al. |
| 2002/0083148 A1 | 6/2002 | Shaw et al. |
| 2002/0109718 A1 | 8/2002 | Mansour et al. |
| 2003/0028695 A1 | 2/2003 | Burns et al. |
| 2003/0066065 A1 | 4/2003 | Larkin et al. |
| 2004/0064570 A1 | 4/2004 | Tock |
| 2004/0133652 A1 * | 7/2004 | Miloushev et al. .......... 709/214 |
| 2004/0168173 A1 * | 8/2004 | Cohen et al. ................. 719/310 |
| 2005/0091340 A1 * | 4/2005 | Facemire et al. ............ 709/218 |

OTHER PUBLICATIONS

M. Satyanarayanan, et al., Coda File System User and System Administrators Manual, Aug. 1997, 79 pages.

Peter J. Braam, The Venus Kernel Interface, v1.2, Mar. 18, 1998, 43 pages.

OA dated Feb. 18, 2009, 2008 for U.S. Appl. No. 11/064,255, 29 pages.

Office Action dated Jan. 25, 2005 cited in U.S. Appl. No. 10/692,212.

Office Action dated Jun. 2, 2005 cited in U.S. Appl. No. 10/692,212.

Office Action dated Dec. 2, 2005 cited in U.S. Appl. No. 10/692,212.

Office Action dated May 19, 2006 cited in U.S. Appl. No. 10/692,212.

Office Action dated Apr. 24, 2009 cited in U.S. Appl. No. 11/064,255.

* cited by examiner

PERSISTENT CACHING DIRECTORY LEVEL SUPPORT

CROSS-REFERENCE TO RELATED APPLICATIONS

This application is a divisional of U.S. patent application Ser. No. 10/692,212, filed Oct. 23, 2003 now abandoned, entitled, "PERSISTENT CACHING DIRECTORY LEVEL SUPPORT." The subject matter of this application is also related to co-pending U.S. patent application Ser. No. 11/064,255, filed on Feb. 22, 2005, entitled, "PERSISTENT CACHING DIRECTORY LEVEL SUPPORT." The entireties of the above-noted applications are incorporated herein by reference.

TECHNICAL FIELD

The present invention relates generally to client side caching, and more particularly to systems and methods that facilitates persistent caching to shield a user and client applications across connectivity interruptions and/or bandwidth changes such that truth on the client is supported.

BACKGROUND OF THE INVENTION

Computing and networking technologies have transformed many important aspects of everyday life. Computers have become a household staple instead of a luxury, educational tool and/or entertainment center, and provide users with a tool to manage and forecast finances, control household operations like heating, cooling, lighting and security, and store records and images in a permanent and reliable medium. Networking technologies like the Internet provide users with virtually unlimited access to remote systems, information and associated applications.

Traditional business practices are evolving with computing and networking technologies. Typically, a user interfaces with a client(s) application (e.g., word processing documents, files, etc.) to interact with a network or remote server(s) that stores information in a database that is accessible by the client application. Databases provide a persistent, durable store for data that can be shared across multiple users and applications. Client applications generally retrieve data from the database through a query(s), which returns results containing the subset of data that is interesting to the client application. The client application then consumes, displays, transforms, stores, or acts on those results, and may modify or otherwise manipulate the data retrieved.

Unfortunately, data is typically inaccessible by the client application from the remote server when the remote server is offline or otherwise disconnected. In particular, every remote name in SMB (Server Message Block) begins with a prefix that identifies two elements: a server and a share in the format of a path beginning with "\\server\share\..." The server is the physical server (e.g., name of machine) to which the client is talking. The share refers to a name on the machine which can be found on the machine's hard drive. Conventionally, the server and the share were created on the same machine or remote server. Therefore, if any object along the \\server\share\... path was disconnected and/or offline, then the server would be marked as offline as well. Multiple shares can be located on one server; thus when one share, for example, becomes disconnected from the network, the entire server goes offline as well.

As can be seen, the operation of client applications has been traditionally dependent upon the connection state of the remote server. In some cases, however, clients may have access to some data while disconnected from the remote server. Unfortunately, if some of the data has been modified by the client, the modified client version is usually not visible to the client and/or user when the server returns online. This is commonly referred to as "truth on the server" because the server version of the data is kept and/or maintained when a conflict between the client and server data is detected. Inevitably, this results in incoherent data by client applications as well as increased server and/or network traffic in addition to the myriad of other inconveniences and problems for most users.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a novel client side caching (CSC) infrastructure which facilitates a seamless operation across connectivity states (e.g., online-offline) between client and remote server. More specifically, a persistent caching architecture is employed to safeguard the user (e.g., client) and/or the client applications across connectivity interruptions and/or bandwidth changes. This is accomplished in part by caching the desirable file(s) together with the appropriate protocol information (e.g., SMB and Webdav (Web-based Distributed, Authoring, and Versioning) to a local (e.g., client) data store. Such information includes object access rights and share access rights which correspond to the file or group of files being cached.

The files to be cached to the local data store (on the client) can be determined in any number of ways according to the preferences of the user. In a first instance, caching can be automatic. In a second instance, caching can be manual. For example, substantially all files accessed at least once by a client application can be cached. Conversely, only certain files marked by the user and/or client application for caching can be cached. In addition, the caching of files accessed by the user can be performed at prescribed time intervals or even at random depending on such user preferences.

Moreover, data requested when connected to a remote server can continue to be accessed, manipulated, and/or modified by the client while disconnected from the server. However, the files are presented to the client as if they reside on the remote physical server location. For instance, any particular file cached to the local hard drive in the prescribed manner maintains the same name whether offline or online server. Hence, it is not apparent to the user or client that it may have been retrieved from either the local cache or from the server.

In light of security concerns, file access parameters including read/write capabilities can also be cached for offline use. Therefore, access to files can be granted or denied in a similar manner as when connected to the server. For example, imagine a user has access rights to a document located on the server. The file is cached to the user's local hard drive. Thus, when disconnected from the server, the user can still access that file from his/her local memory as long as that the requisite access rights (e.g., object access rights and share access rights) accompany the respective file (e.g., cached with the file). However, if the corresponding access rights are not cached locally, then access may be denied.

According to another aspect of the invention, the user experience, whether offline or online, is substantially uniform across server types. In conventional networking infrastructure, the user may not know which type of network is serving up the files that he/she is accessing and specifically, the reasons why one server allows a particular feature while another server does not. In the present invention, achieving uniformity across server types is based at least in part upon the location of the CSC component. For example, client side caching can be located above all redirectors, independent of the type of network redirection being performed. As a result, the offline experience remains consistent and without change when switching between server types. By way of example, I/O requests can be sent to the CSC component before the DFS component to ensure that all relevant information (e.g., identifications of DFS links, corresponding physical shares, share access rights, etc.) is cached before the connection state changes from online to offline. The DFS component can only obtain referrals while online and the connection may be lost at any time.

According to yet another aspect, the present invention provides for truth on the client. This is accomplished in part by write back caching. Write back caching involves caching data on the client first and then pushing it back to the server at appropriate times. For example, any file modified or manipulated by the client while disconnected from the remote server can be stored to the client's memory and then uploaded to the server when the client regains its connection to the server. This can be particularly useful when a conflict in the data exists between the client copy and the server copy. User resolution may be needed to resolve the conflict in data; however, when reconnected to the server, the user continues to see its modified version of the file rather than the server's version.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
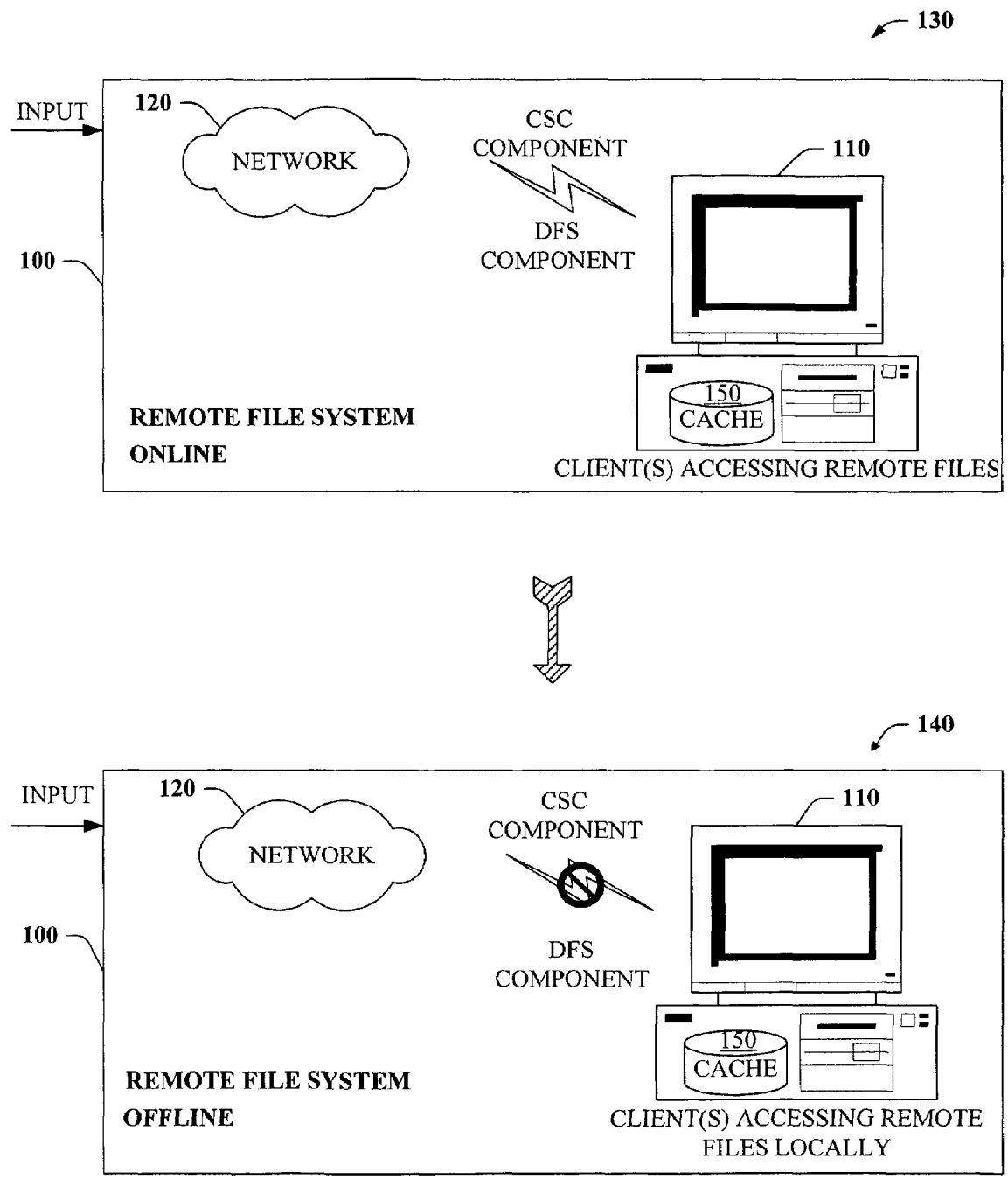
FIG. 1 illustrates a high level schematic block diagram of a remote file system in accordance with one aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

Furthermore, the term "inference" as used herein refers generally to the process of reasoning about or inferring states of the system, environment, and/or user from a set of observations as captured via events and/or data. Inference can be employed to identify a specific context or action, or can generate a probability distribution over states, for example.

The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Accordingly, it is to be appreciated that various aspects of the subject invention can employ probabilistic-based and/or statistical-based classifiers in connection with making determinations and/or inferences in connection with the subject invention. For example, such classifiers can be employed in connection with utility-based analyses described herein. A support vector machine (SVM) classifier can be employed which generally operates by finding a dynamically changing hypersurface in the space of possible inputs. Other directed and undirected models/classification approaches include, e.g., naïve Bayes, Bayesian networks, decision trees, Hidden Markov Model (HMM), data fusion engine, neural network, expert system, fuzzy logic, or any suitable probabilistic classification models providing different patterns of independence can be employed. Classification as used herein also is inclusive of statistical regression that is utilized to develop models of priority.

The present invention involves systems and methods that facilitate client side caching and truth on client persistent caching. Client side caching provides off-line access to files and/or other data when the network version of the file is otherwise unavailable due to a network outage or intentional disconnection. It also can increase server scalability while connected to the network by reducing file operations directed at remote servers. By the employment of the present invention, a client can access the cached copy of a file using the same file name and with the same namespace as when the client is connected to the network. Thus, the client may not even be aware that a temporary disconnection from the network (e.g., remote server(s)) is occurring since access to and/or modification of one or more files has not been interrupted.

The present invention can be used in conjunction with DFS (Distributed File System) shares or links. DFS links are based at least in part upon logical names which can be expressed in the format of . . . \\domain\name\ . . . , for example. However, logical names are not necessarily physical names that identify a server. Rather, DFS links can point to a physical server(s) or file(s). DFS links are structured to deal with SMB shares, NFS shares, as well as Webdav (or DAV) shares or any other remote process that an operating system can be pointed at by a DFS share or link. It should be understood that the logical name space can include multiple DFS links which are backed up by a physical share on a server which can be individually online or offline. Thus, the client side caching can keep track of any particular DFS link persistently so that it can transition a connection state at a proper logical directory. This effectively minimizes the scope of offlineness to the physical share.

Moreover, client side caching can support state transitions at the directory level on a logical path which represents a DFS link. Therefore, if a physical share is down, only part of the logical name space hosted on the physical share is offline—the rest of the logical name space remaining online. In a cascaded DFS scenario, part of the name space can be offline while the next or adjacent part of the name space can still be online. For example, the underlined portion in the following path is offline while the remaining portions remain online.

s:\\msdev\release\lab01\4051\x86gsf\4073\file.

This is because 4051 may be a DFS link pointing to a physical share and x86gsf maybe a file located on a portion of the share. Thus, it appears that share 4051 is offline and accordingly, any files listed that belong to that offline share will also appear to be offline. Conversely, 4073 may correspond to another DFS link or physical share that is online. Thus, despite being downstream from the offline link or share, any files belonging to other online physical shares remains online.

The figures below further describe the many aspects of client side caching and the manner in which truth on the client can be achieved. It should be appreciated that the systems and methods described herein are merely representative and are not meant to limit the scope of the invention.

Referring now to FIG. 1, there is illustrated a high-level, schematic diagram of an exemplary remote file system 100 comprising client side caching (CSC) architecture for communication and interaction between one or more clients 110 and a network 120 or remote server(s) in accordance with an aspect of the present invention. In general, a client application makes a request (by way of input to the remote file system 100) using paths into a kernel portion of the remote file system 100. Such requests typically are directly communicated to a redirector component (not shown) such as SMB or Webdav or some other file system over the relevant network. A CSC component such as a client-side-caching mechanism is situated at about the middle of that path. The CSC component comprises a data store for offline retrieval of data which was previously cached. The previous caching may have taken place when the client was connected (online as depicted by 130) to the remote network 110 or server.

Thus, when a data request enters the kernel, a determination can be made as to whether the remote server is online. If it is not online such as depicted by 140, the CSC component can direct the file request to a local cache 150 on the client. If the file was previously cached by the user (client) and the user/client has the requisite access rights, then access to the particular file can be granted to the user (client).

However, when the system is online and a file request is made, the local cache on the client's side can determine whether it also has a copy of the file. If it does contain a copy, the CSC component can retrieve the data from data store, thereby mitigating network traffic. To some extent, it may also be possible to request such information from other clients, provided that they are on the same or similar network. This configuration can be referred to a distributed client cache system, whereby a plurality of clients can access each other's cache. As the technology continues to advance in this area, the distributed client cache system may become more efficient with respect to performance, speed, and bandwidth consumption.

In general, the CSC component operates on logical namespaces (e.g., names of files as users see them) and supports connection state transitions at the directory level on a logical path that is representative of a DFS link. The DFS link can point to a physical share and typically translates a logical path into its physical path. Logical namespaces can be backed up by multiple shares on different physical servers. By querying DFS component, CSC can identify those directors on a logical path which are DFS links and store them on a list.

Hence, when a connection state changes (e.g., online to offline) due to a failure returned from a redirector or a network disconnect indication, for example, the CSC component will only transition the directory on the list that hosts to the object.

The rest of the logical name space is not affected. Therefore, when a file I/O request comes down, the CSC component can cross-reference the list to see if the path is offline. If it is, the request is processed offline. Otherwise, it will be sent to a redirector for further processing. The transition version of the directory where the path is forced offline can be tracked.

In addition, directory access rights as well as share access rights (if a DFS link) for the respective portions of the logical name space are also stamped on the directory cache entries. Thus, when a create request comes down while offline, the CSC component can check the file access and share access rights to determine whether to allow the request a success.

Figure 2:
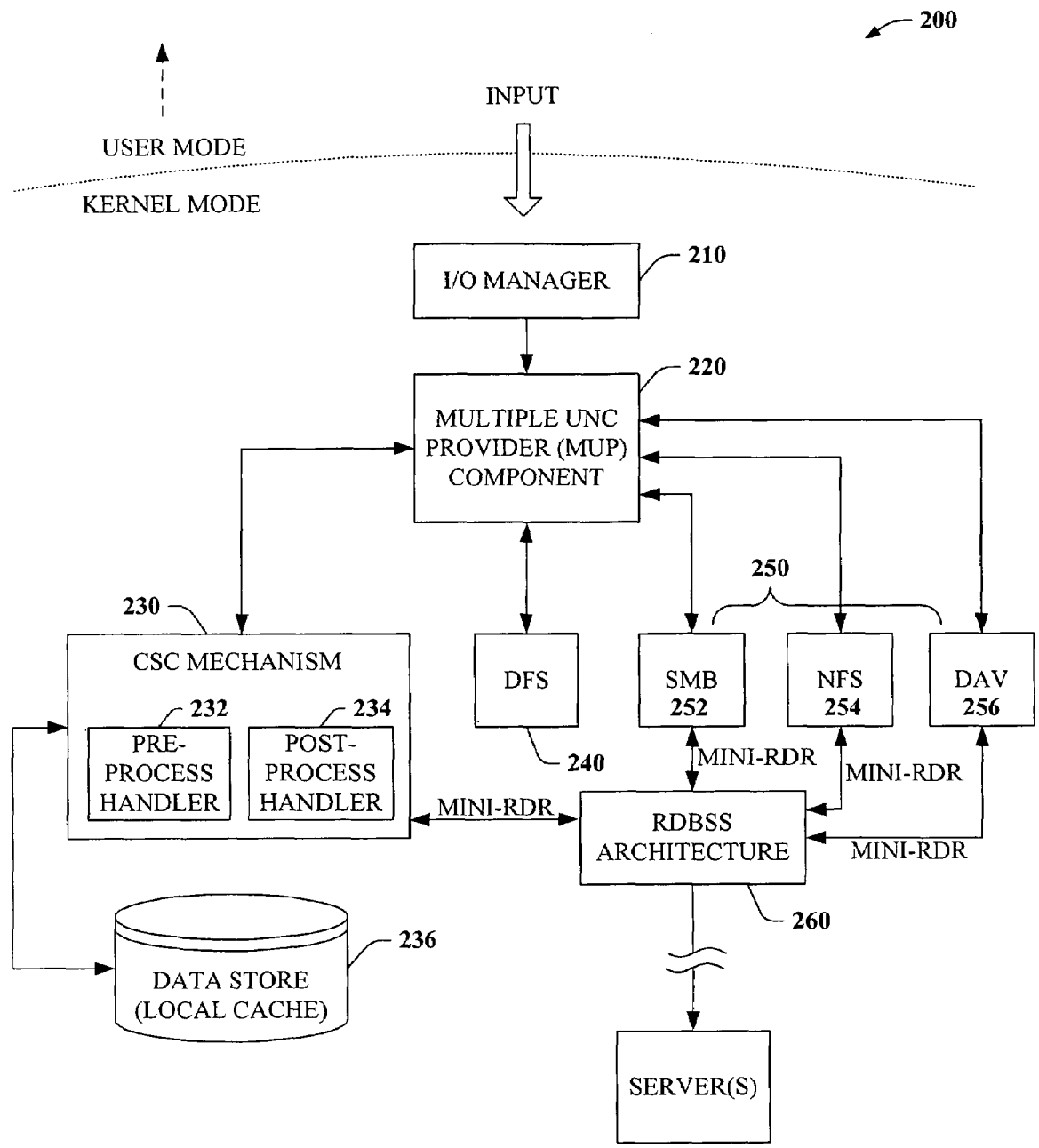
FIG. 2 illustrates a block diagram of a remote file system in accordance with one aspect of the present invention.

Referring now to FIG. 2, there is illustrated a block diagram of an exemplary remote file system 200 utilizing client side caching in accordance with an aspect of the present invention. Whenever a client/user application generates a request for the file system such as to gain access to a directory or file, an I/O Manager 210 initially can determine whether the desired path is a local or remote path. If it is a remote path, then the remote file system 200 as shown in FIG. 2 can be employed. The remote file system 200 comprises a Multiple UNC (Universal Name Code) Provider (MUP) 220, surrogate providers (e.g., CSC 230, DFS 240), and one or more redirectors 250 (e.g., SMB 252, NFS 254, and DAV (Webdav) 256).

One notable aspect in the system 200 is that the CSC mechanism 230 and the DFS 240 are at the same level as the MUP 220. Thus, CSC 230 can receive all or substantially all UNC and drive-letter-based I/O destined for a network or remote server. Because the CSC 230 registers as a surrogate provider, it can also receive nearly if not all pre- and post-view of IRP and FastIO calls to network providers. One advantage to this is that an extended mini-redirector interface can be used to communicate with a plurality of mini-redirectors in order to get additional information from the mini-redirector and to simplify callback mechanisms for events such as oplock breaks and transports appearing and disappearing from the redirectors.

Substantially all calls fielded by the MUP 220 are handed down to the appropriate redirectors 250. In general, the CSC mechanism 230 can also filter substantially all calls going through the MUP 220, thus allowing it the opportunity to decide on appropriate caching pathnames.

Unlike conventional systems, the MUP 220 in the present invention supports surrogate providers. Surrogate providers such as the CSC mechanism 230 can register to the MUP 220 with pre- and post-process handlers (232, 234). For instance, the MUP 220 calls the pre-process handler(s) 232 in a predetermined order before calling any of the network providers. It can return one of the following statuses when the pre-process is done:

STATUS_MORE_PROCESSING_REQUIRED—The request has not been satisfied. The IRP needs to be sent to the next provider.

STATUS_PENDING—The surrogate provider needs more time to process the request. A MUP resume routine will be called after the process is done.

Other status—The surrogate provider has handled the request. MUP can complete the IRP without invoking the rest of the providers.

Subsequently, the CSC post process handler 234 can be called after the request is handled by a network provider and/or another surrogate provider, depending on the status returned on its pre-process. The post-process handler 234 has a chance to handle the request again. For instance, it can store the data returned back from the server if "success" is returned, or take the connection offline, process the request from cache, and return "success".

The post-process handler(s) 234 are called in the opposite order some time thereafter. Since the CSC mechanism 230 is in the path of every call that the MUP handles, the CSC can do the relevant pre- and post-processing that is necessary to obtain the appropriate functionality.

As can be seen in FIG. 2, the MUP 220 can call the CSC 230 and/or the DFS 240, in either order. However it is preferable that the MUP 220 calls the CSC mechanism 230 before the DFS 240. This can be important for a create request in particular because it gives the CSC mechanism 230 a chance to cache the logical path in a local cache 236 before the DFS 240 translates the file object name into the physical path.

Figure 3:
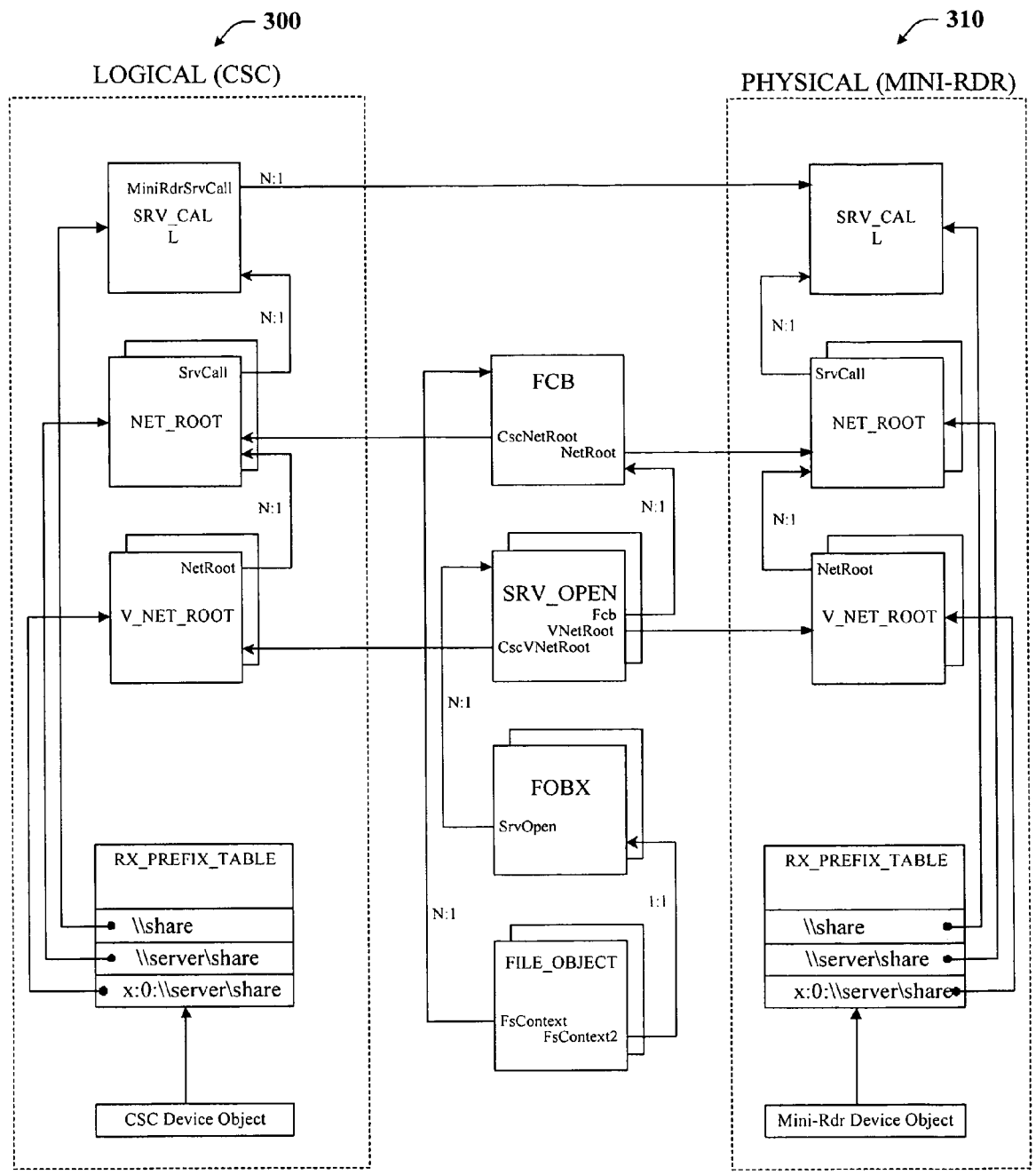
FIG. 3 illustrates an exemplary data structure in accordance with one aspect of the present invention.
Figure 4:
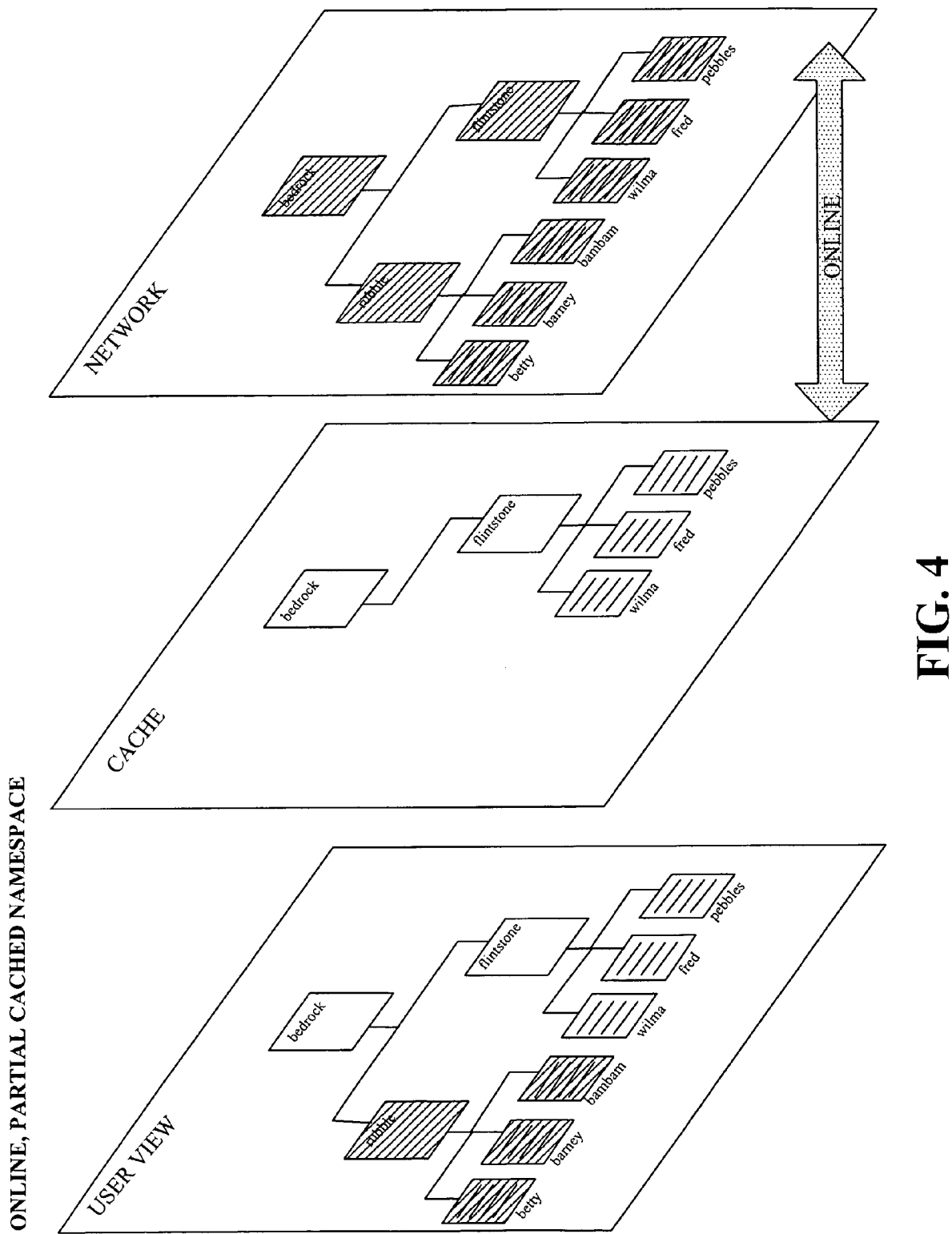
FIG. 4 illustrates an exemplary diagram of a user's view of an online, partial cached namespace in accordance with one aspect of the present invention.
Figure 5:
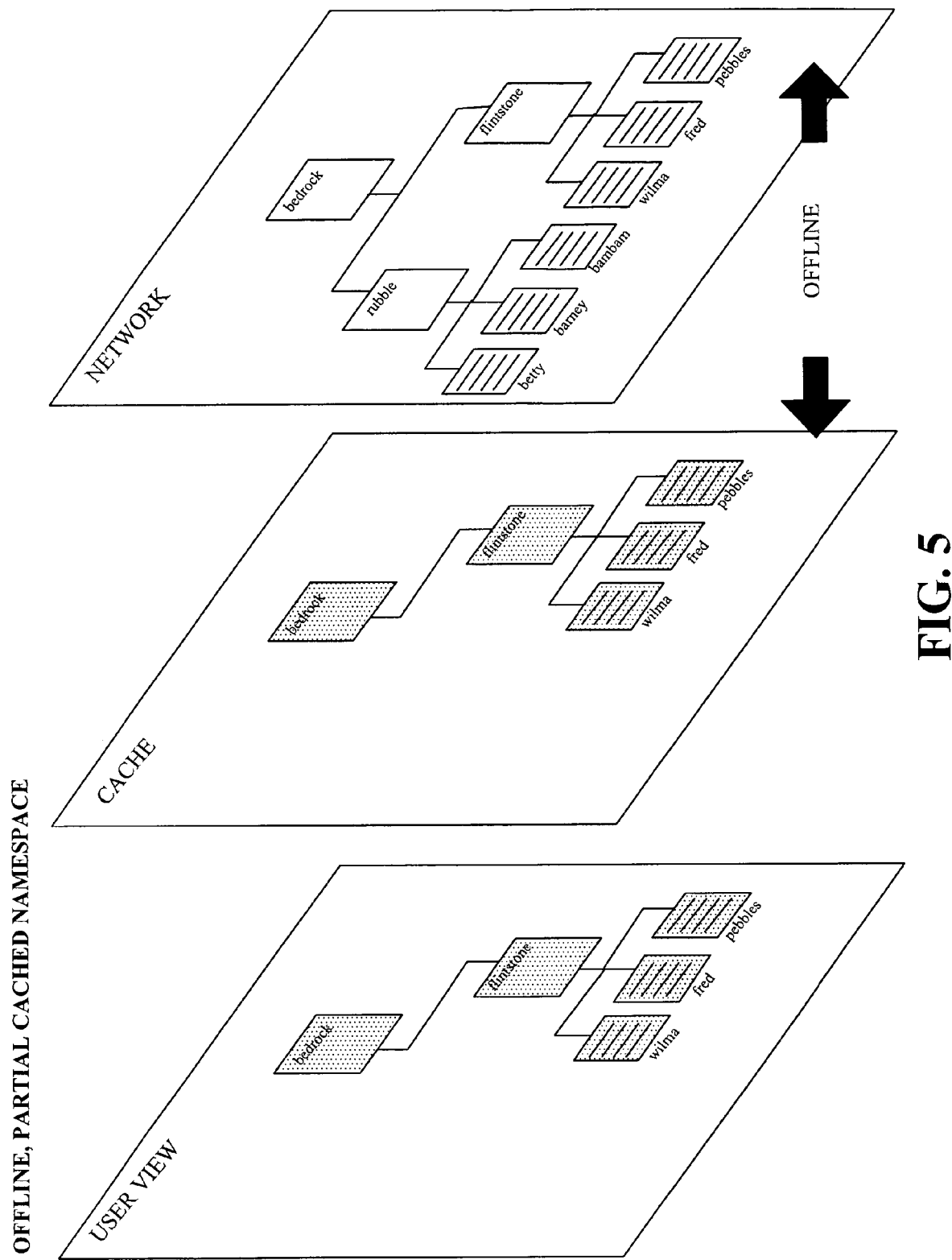
FIG. 5 illustrates an exemplary diagram of a user's view of an offline, partial cached namespace in accordance with one aspect of the present invention.

FIG. 3 illustrates a schematic block diagram of representative file-based data structures in both logical (CSC) 300 and physical namespace (Mini-Rdr) 310 and the relationships between them when a file is created online. Essentially, CSC 300 maintains the connection based data structures in logical name space while Mini-Rdr 310 maintains the connection based data structures in physical name space. File based data structures are created by CSC 300 and shared among CSC 300 and Mini-Rdr 310. Some file based data structures have access to the connection based data structures in both logical and physical name space. Therefore, file I/O requests can be executed by either CSC 300 or Mini-Rdr 310, based on the circumstances. By maintaining such data structures, the CSC can provide and/or facilitate persistent caching to yield truth on the client.

There are several operations that CSC can perform to implement delay write persistent caching semantics. At least a portion of CSC consistency is based in part on the last write time stamp and file-size; hence, it has to do various tasks at create/close time to ensure that this information is accurate.

For example, in a File Create Operation, a create request comes to the MUP (e.g., MUP 220 in FIG. 2). The MUP 220 calls the pre-process handler (e.g., FIG. 2, 232) of the CSC (surrogate provider). The CSC attempts to find or create connection data structures for the file object that is issued with the create request. Examples of the connection data structures include a server Connection structure: SrvCall; a share mapping structure: NetRoot; and a per-user share mapping structure: VNetRoot.

If the part of the logical namespace on which the target of the create falls is already offline, the surrogate (e.g., CSC) finds or creates the logical namespace structure and returns "success". However, if the surrogate provider does not have the information indicating that the path is offline, it can ask the MUP to proceed with further processing of the create call after creating or finding the above structures in the logical name space.

The MUP may continue its perorations, by supplying the path to the DFS (e.g., FIG. 2, 240), which in turn might translate the logical path to an actual server share, depending on whether there is a DFS link along the way. Ultimately, one redirector (e.g., FIG. 2, 250) claims the name. If that redirector is part of RDBSS architecture (e.g., FIG. 2, 260—a communication link between CSC component and redirectors), then a mini-redirector (MIMI-RDR) automatically refers to RDBSS to execute the common create code. When the create call returns to the MUP, it can call the CSC post-process handler. If the call is not fielded by a mini-redirector that supports the CSC, a post-processor routine may tell the MUP that it is not interested in the file, and no subsequent operations are seen by the CSC.

On a successful open of the path, all the connection structures get established at the appropriate mini-redirector and a handle is available to the file. The CSC pre-process handle can get the file extension, size, and caching flags of the path by looking at the physical NetRoot of the Fcb (file control block—an abstraction of a file that contains information about the file such as name, size, time stamps, cache map, shared access rights, mini-redirector device object, pointer to NetRoot, etc.) of the parent directory, or by issuing a FSCTL (File System Control) against the handle.

Once this information is obtained, the CSC can decide whether to own this file object. If the share characteristics so demand, such as it being a cacheable share, or if the mini-redirector demands caching be on all the time, such as DAV, the CSC can claim ownership and create the file data structures for the open instance (e.g., Fcb, SrvOpen, and Fobx) represented by this file object. However, if the share is marked non-cacheable, the CSC can disassociate itself from the file object so as to not see the operations against this file object thereafter.

It should be understood that SrvOpen refers to Server Side Open Context which is the abstraction of an open sent to the server, and which stores the desire access, share access, security context, server file handle, mini-rdr context, pointer to Fcb, etc. Multiple SrvOpens with different access rights and session IDs can collapse on a single Fcb. Furthermore, Fobx refers to File Object Extensions which is the RDR (redirector) extension of a file object, containing information unique to a handle, such as a directory enumeration template, resume key, etc. It also has the pointer to a SrvOpen. Multiple Fobx can collapse on a single SrvOpen, if their access rights match.

After the file data structures are created and linked to the connection based data structures of both logical and physical namespaces, the CSC can issue a create directly to the mini-redirector with the prefixed file name in the physical namespace which can be obtained through the file handle for querying attributes. The CSC can keep the connection data structure around for some time even if it is a non-cacheable path. In addition, it can put the parent directory on the name cache under the NetRoot so that it can quickly determine the persistent caching characteristics on the next create request without issuing an open to it again. With this approach, per directory caching can be obtained.

Moreover, the connection-related data structure can be separated and the file-related data structure can be shared between the logical and physical namespaces. The CSC and redirectors can create their own SrvCall, NetRoot, and VNetRoot, and share the Fcb, SrvOpen and Fobx. This way, the CSC and redirectors can handle many different UNC paths (logical and physical) without doubling the resources such as in-memory data structures and cache maps.

In a File Read Operation, the CSC needs to know the buffering state of the file before every read from the persistent cache. If the buffering state is such that read caching is allowed then the CSC can read the persistently cached data and serve it to the app. However, if the buffering state is at the equivalent of OPLOCK_LEVEL_NONE, then it should not return the data from the cache and let all the reads go to an underlying provider. The buffering state info can be obtained by checking the FCB_STATE_READCACHING_ENABLED flag on Fcb->FcbState.

If read caching is allowed and the file is not sparse, the CSC fills a user buffer with cached data and return success on the CSC pre-process. MUP will return the request without forwarding this request to mini-rdr. If read caching is disabled or the file is sparse, the CSC sends the read request directly to the mini-redirector on the pre-process. Once the request is completed by the mini-redirector successfully, data is saved on cache. If an error is returned from mini-redirector, the CSC attempts to transition to offline and if succeeds, complete the request offline. Either case, read operation is completed on CSC pre-process without having MUP sends the request to mini-redirector.

With respect to a File Write Operation, the CSC needs to know the buffering state of the file before every write is executed. If the buffering state is such that write caching is allowed, then the CSC can write the persistently cached data and return success to the application. However, if the buffering state is at the equivalent of OPLOCK_LEVEL_II or less, then it should not cache the write and let all the writes go to the underlying provider. Again the buffering state info can be obtained by checking the FCB_STATE_WRITECACHING_ENABLED flag on Fcb->FcbState.

If write caching is allowed and the file is not sparse, the CSC sends the write request to local cache and return success on the CSC pre-process. MUP will return the request without forwarding this request to mini-rdr.

If write caching is disabled or the file is sparse, the CSC sends the write request directly to the mini-redirector on the pre-process. Once the request is completed by the mini-redirector successfully, data is saved on cache. If an error is returned from the mini-redirector, the CSC attempts to transition to offline and if it succeeds, it completes the request offline. In either case, write operation is completed on CSC pre-process without having the MUP send the request to mini-redirector.

In a File Close Operation, the MUP calls CSC pre-process first when a close request comes to the MUP. The CSC pre-process checks if there is any cached data from a previous write request on this file. If so, the CSC sends back the only sections with the modified data to the server by issuing write requests to mini-redirector. After cached data are pushed back to the server, CSC pre-process sends the close request to the mini-redirector. Once the mini-redirector completes the close request, CSC pre-process queries the timestamp from the server, sets it on the cached file, closes cache handle, and returns to MUP. Thus writes are cached until the file is closed. If durable op-lock is granted to the client, the close request is only executed locally since there is no remote handle to the file. Writes are cached until the op-lock is broken.

Moreover, if a handle is opened online, CSC will follow the design principle of always processing the request after a redirector takes a first look, except with a create request. Below are exemplary pseudo codes for the control flows of the typical create, read, and write operations. Other file I/O operations are similar to read/write.

```
Create
MupCreate(Irp(FileObject))
    CscSurrogatePreProcess(MupIrpContext)    // cscinit.c
                                             // invoke RxFsdDispatch
        RdbssCommonCreate(Irp(FileObject(LogicalPath)))    // Create SrvCall, NetRoot,
                                                           //VNetRoot for the logical
                                                           //path. Create or find Fcb,
                                                           // SrvOpen, Fobx for the file
                                                           //object
```

```
            Fcb->RxDeviceObject = CscDeviceObject
            Fcb->CscNetRoot = RxContext->Create.NetRoot;
            SrvOpen->CscVNetRoot = RxContext->Create.VNetRoot;
            CscCreate // openclose.c
                FileObject->FsContexts = Fobx
                If Cache is dirty
                    Return STATUS_SUCCESS // local open
                Else
                    Return More_Processing_Required // remote open
If Status == More_Processing_Required // MUP
    DfsSurrogatePreProcess(MupIrpContext)
        If IsDfsPath(FileObject(LogicalPath)) then
            ResolveDfsPath(FileObject(logicalPath))
            RedirectorDispatcher(Irp(FileObject(PhysicalPath)))
                RdbssCommonCreate(Irp(FileObject(PhysicalPath))) // Create SrvCall,
                                                                //NetRoot, VNetRoot
                                                                //for physical path
                    Fobx = FileObject->FsContexts
                    SrvOpen = Fobx->SrvOpen
                    Fcb = SrvOpen->Fcb
                    Fcb->MiniRdrDeviceObject = RdrDeviceObject
                    Fcb->NetRoot = RxContext->Create.NetRoot;
                    SrvOpen->VNetRoot = RxContext->Create.VNetRoot;
                    RedirectorCreate(RxContext) // Create mini-rdr extensions, contact server,
                                                //set mini-rdr device object
                    IrpCompletion(Irp) // Mini-rdr
                    Return status
        MupResumeIoOperation
            DfsSurrogatePostProcess(MupIrpContext)
        MupResumeIoOperation
            CscSurrogatePostProcess(MupIrpContext)
                CreateCompletion(SrvOpen,Fcb) // Synchronize the create request
        Else // none DFS path
            Return More_Processing_Required
        MupResumeIoOperation
            MupLocateRedirector(Irp(FileObject(LogicalPath)))
            RedirectorDispatcher(Irp(FileObject(LogicalPath)))
                Fobx = FileObject->FsContexts
                SrvOpen = Fobx->SrvOpen
                Fcb = SrvOpen->Fcb
                Fcb->MiniRdrDeviceObject = RdrDeviceObject
                Fcb->NetRoot = RxContext->Create.NetRoot;
                SrvOpen->VNetRoot = RxContext->Create.VNetRoot;
                RdbssCommonCreate(Irp(FileObject(LogicalPath))) // Create SrvCall,
                                                                //NetRoot, VNetRoot
                    RedirectorCreate(RxContext) // Create mini-rdr extensions, contact server,
                                                //set mini-rdr device object
                    IrpCompletion(Irp) // Mini-rdr
                    Return status
        MupResumeIoOperation
            DfsSurrogatePostProcess(MupIrpContext)
        MupResumeIoOperation
            CscSurrogatePostProcess(MupIrpContext) // cscinit.c
                CreateCompletion(SrvOpen,Fcb)  // Complete SrvOpen and Fcb construction,
                                               //synchronize other opens with the same
                                               // path, replace the Mini-rdr dispatch table
                                               // with CSC dispatch table
    IrpCompletion(Irp) // MUP
Else // more_process_required
    IrpCompletion(Irp) // MUP
```

As you see from the above, CSC pre-process handler creates the SrvCall, NetRoot and VNetRoot for the logical path and Fcb, SrvOpen and Fobx for the file object. Fobx is stored on the FileObject->FsContext2 so that mini-rdr can pick it up when it is called from either DFS or MUP. If the Fcb is created by the CSC, Fcb->RxDeviceObject is CSC Device Object. Otherwise, it will be mini-rdr Device Object. Mini-rdr also sets the Fcb->MiniRdrDeviceObject on the create path. In addition, the subsequent create request on the same file has to wait on the CSC pre-process handler. CSC post process handler signals the other create request after the first one is completed.

```
Read/Write
MupFsdIrpPassThrough(Irp(FileObject))
    CscSurrogatePreProcess(MupIrpContext) // cscinit.c
        Return More_Processing_Required
    MupResumeIoOperation
        DfsSurrogatePreProcess(MupIrpContext)
            Return More_Processing_Required
        MupResumeIoOperation
            RedirectorDispatcher(Irp(FileObject))
                RdbssCommonRead/Write(RxContext) // read.c or write.c
                    If !PagingIO then
                        If CcRead/write(FileObject,Offset,Length) then
```

```
        IrpCompletion(Irp)
    Fcb->RxDeviceObject->Dispatcher[Read/Write](RxContext)
        CscRead/Write(RxContext) // readwrit.c
            If oplockAcquired && CacheNotSparse then
                CscRead/WriteCache(RxContext)
            Else
                Fcb->MiniRdrDeviceObject->Dispatcher[Read/Write]
                    (RxContext)
                    RedirectorRead/Write(RxContext) // read.c or write.c
                CscRead/WriteEpilogue // cache data from or to server
    IrpCompletion(Irp)
MupResumeIoOperation
    DfsSurrogatePostProcess(MupIrpContext)
MupResumeIoOperation
    CscSurrogatePostProcess(MupIrpContext)
        Close
MupFsdIrpPassThrough(Irp(FileObject))
    CscSurrogatePreProcess(MupIrpContext)
        Return More_Processing_Required
MupResumeIoOperation
    DfsSurrogatePreProcess(MupIrpContext)
        Return More_Processing_Required
    RedirectorDispatcher(Irp(FileObject))
        RdbssCommonClose(RxContext) // close.c
        Fcb->RxDeviceObject->Dispatcher[Close](RxContext)
            CscClose(RxContext) // openclos.c
            If FileIsDirty(RxContext) then
                CscFlushDirtyPages(RxContext)
                    Fcb->RxDeviceObject->Dispatcher[Write](RxContext)
                Fcb->RxDeviceObject->MiniRdrDispatcher[Close](RxContext)
                    RedirectorClose(RxContext) // openclos.c
                CscCloseEpilogue(RxContext) // close CSC handle
            Dereference(Fobx)
            Dereference(SrvOpen->VNetRoot)
            Dereference(SrvOpen->CscNetRoot)
            Dereference(SrvOpen)
            Dereference(Fcb->NetRoot)
            Dereference(Fcb->CscNetRoot)
            Dereference(Fcb)
    IrpCompletion(Irp)
MupResumeIoOperation
    DfsSurrogatePostProcess(MupIrpContext)
MupResumeIoOperation
    CscSurrogatePostProcess(MupIrpContext)
```

If a handle is opened offline, the CSC will handle the file I/O requests on the pre-process, since there is no redirector to claim the path. Here are control flows of the create, read, write and close operations. Other file IO operations are similar to read/write.

```
            Create
MupCreate(Irp(FileObject))
    CscSurrogatePreProcess(MupIrpContext)
        RdbssCommonCreate(Irp(FileObject(LogicalPath)))   // Create SrvCall, NetRoot,
                                                          //VNetRoot for the logical
                                                          // path. Create or find Fcb,
                                                          // SrvOpen, Fobx for the file
                                                          //object
            Fcb->RxDeviceObject = CscDeviceObject
            Fcb->CscNetRoot = RxContext->Create.NetRoot;
            SrvOpen->CscVNetRoot = RxContext->Create.VNetRoot;
            CscCreate // openclose.c
                If Disconnected then
                    Return Success
                Else
                    Return More_Processing_Required // remote open
MupResumeIoOperation
    DfsSurrogatePreProcess(MupIrpContext)
        Return More_Processing_Required
MupResumeIoOperation
    MupFindRedirector(Irp(FileObject(LogicalPath)))
        return Network_Disconnected
MupResumeIoOperation
    DfsSurrogatePostProcess
MupResumeIoOperation
    CscSurrogatePostProcess
        If TransitionOnline(Status) then
            CscCreateEiplogue(RxContext)
                If !CacheSparse then return Success
            CreateCompletion(SrvOpen,Fcb)  // Complete SrvOpen and Fcb construction,
                                           //synchronize other opens with the same
                                           //path
    IrpCompletion(Irp) // MUP
        Read/Write
MupFsdIrpPassThrough(Irp(FileObject))
    CscSurrogatePreProcess(MupIrpContext)
        RdbssCommonRead/Write(RxContext)
            If !PagingIO then
                If CcRead/write(FileObject,Offset,Length) then
                    IrpCompletion(Irp)
            Fcb->RxDeviceObject->Dispatcher[Read/Write](RxContext)
                CscRead/Write(RxContext)
                    Read/WriteCache(RxContext)
    IrpCompletion(Irp) //MUP
        Close
MupFsdIrpPassThrough(Irp(FileObject))
    CscSurrogatePreProcess(MupIrpContext)
```

-continued

```
        RdbssCommonClose(RxContext)
        Fcb->RxDeviceObject->Dispatcher[Close](RxContext)
            CscClose(RxContext)
                CscCloseEpilogue(RxContext)
        Dereference(Fobx)
        Dereference(SrvOpen->CscNetRoot)
        Dereference(SrvOpen)
        Dereference(Fcb->CscNetRoot)
        Dereference(Fcb)
    IrpCompletion(Irp) //MUP
```

As previously mentioned, the present invention facilitates a seamless user experience that includes online to offline transition, offline to online transition, merge and synchronization, and low bandwidth operations. Unlike conventional systems, the present invention is capable of transition connection state at the share as well as the directory level. If one share goes offline, other shares on the same server (logical name space) remain online. Offline at directory level is built for the logical name space with a DFS link(s). When a physical share is disconnected, the part of the name space hosted on the physical share is disconnected. The rest of the logical path remains online. In cascaded DFS cases, it is possible that you can have mixed online and offline directories along the logical path.

In one aspect of the invention, the CSC keeps a transition list of the directories on the logical NetRoot which are backed up by a physical share. By default, the logical share is the first one on the list. Based on the result returned back from the DFS API that tells whether the directory is a DFS link, the CSC can add the directories representing DFS link on the list. When an operation fails with a network error, the directory on the list close to the object gets transitioned offline. If there is only the logical share (e.g., non-DFS case) on the list, the share is transitioned offline. The CSC keeps the connection state, version number, cache ID, etc on each of the list item.

The online to offline transition continues to work seamlessly as previous versions of the CSC. The transition can be triggered by the network related error during I/O operation or by the transport disconnection indication. The application handle remains valid and continues to work offline. The CSC simply marks the directory (or share) offline, increases the version number, and references the NetRoot so that the connection is maintained until it is transitioned back online.

Similar to transitioning offline, the CSC is capable of transitioning back online at the share and directory level. The CSC does not invalidate application handles while transitioning the connection to online. Rather, it eliminates the requirement of user initiation of the transition followed by closing all the applications. This removes a main blocker for the CSC to work on a TS/FUS environment. In addition, the subject CSC defers the merge and synchronization process after transitioning online so that transition becomes fast. With both improvements, transitioning online becomes as painless as transitioning offline.

In practice, for instance, transitioning to online is initiated by a CSC agent as the result of discovering that a path has become reachable. The CSC agent periodically scans the paths that are offline. A network arrival event can also trigger CSC agent to transition the paths. Once CSC agent detects a path can be reachable, it sends an IOCTL (I/O control) to a CSC driver to initiate an online transition on this path. The CSC driver simply resets the state of the directory on the transition list and increases the version number. All the existing handles still remain offline until the handle is backpatched individually. Per file offlineness can be accomplished in part by having a flag on SrvOpen indicating the offline state independent of the network connection state.

Once the connection is online, the CSC driver starts to backpatch the handles. It walks through the list of the outstanding Fcbs and backpatches the handles for directories first based at least in part on the following reasons:

(a) it is desirable for users to have online directory view as soon as the connection is online;

(b) the directory does not have data to flush; and (c) the directory is less likely to get into conflict.

The CSC completes the pending directory change notification on these handles so that the application can send a new directory enumeration to see the online view. To maintain the consistent view of the directory after transitioning online and before outbound synchronization completes, the CSC can merge the results from the server with the results from the cache, such as add, remove, or modify entries on the enumeration buffer depending on the cache files. The namespace as seen by the user is a union of the namespace as it exists on the server and as it exists in the offline store. This ensures that the applications, and hence, the user retains a consistent view of the files after transitioning online automatically, such as file sizes and time stamps, even when the files have been modified locally but the changes have not been pushed out.

FIGS. 4-7 illustrate how the contents of the cache and the associated network files are viewed by the user on the client computer by way of a user interface. Each diagram contains three panes. The right-most pane depicts the contents of a network file system, the middle pane depicts the contents of a local CSC cache, and the left-most pane depicts what the user "sees" when viewing the remote namespace through an application of an operating system. The scenarios are represented by a fictitious file system tree composed of one root directory and two subdirectories containing three files each. In particular, FIG. 4 demonstrates what a user (end-user) would see when connected to the network with a partially cached namespace. As shown, the user-view includes the partial cached namespace (e.g., \bedrock\flintstone\wilma-fred-pebbles) as well as subdirectory rubble with files betty, barney, and bambam which is from the network version of root directory-bedrock. Since sub-directory rubble and its files are not cached in the user's local cache, they are no longer viewable by the user when disconnected from the network. This is depicted in the image shown in FIG. 5.

Figure 6:
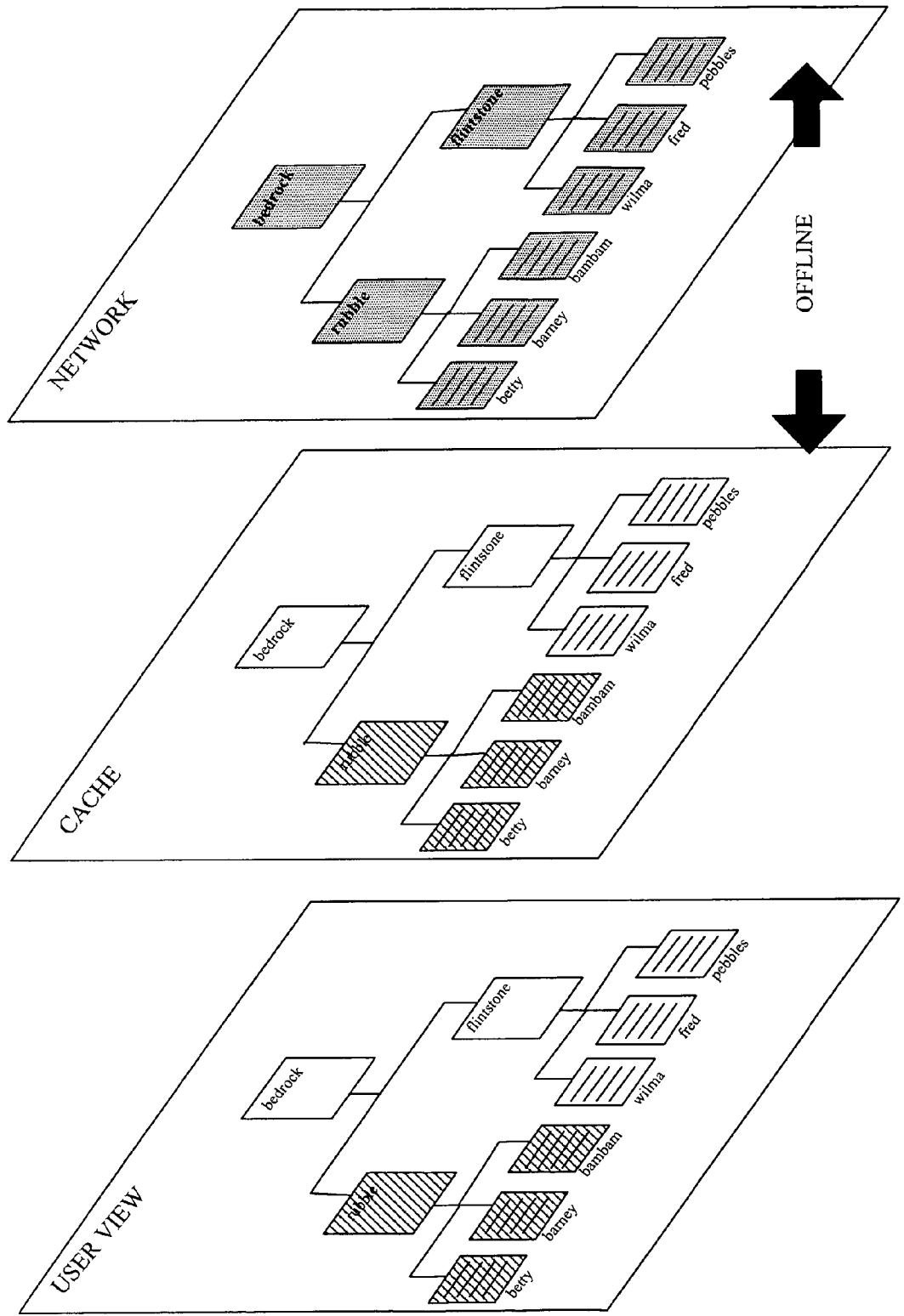
FIG. 6 illustrates an exemplary diagram of a user's view of an offline, partial cached namespace with shadow instances in accordance with one aspect of the present invention.

In FIG. 6, the client computer is again offline or disconnected from the network at least temporarily. In this period of disconnection, the cache comprises similar copies of the root directory bedrock. For instance, it is apparent that the cache has been updated with the modified portions of sub-directory rubble (see cross-hatched boxes compared to solid white boxes in cache and user views). However, the network comprises an apparently different version or copy of the bedrock root directory as a whole. This can be an indication that the modifications to some of the files stored in the local cache can be stored in the cache while offline and viewed by the user during the disconnection period. However, it also clearly illustrates that the network version is not updated with the modified version during the offline period.

Figure 7:
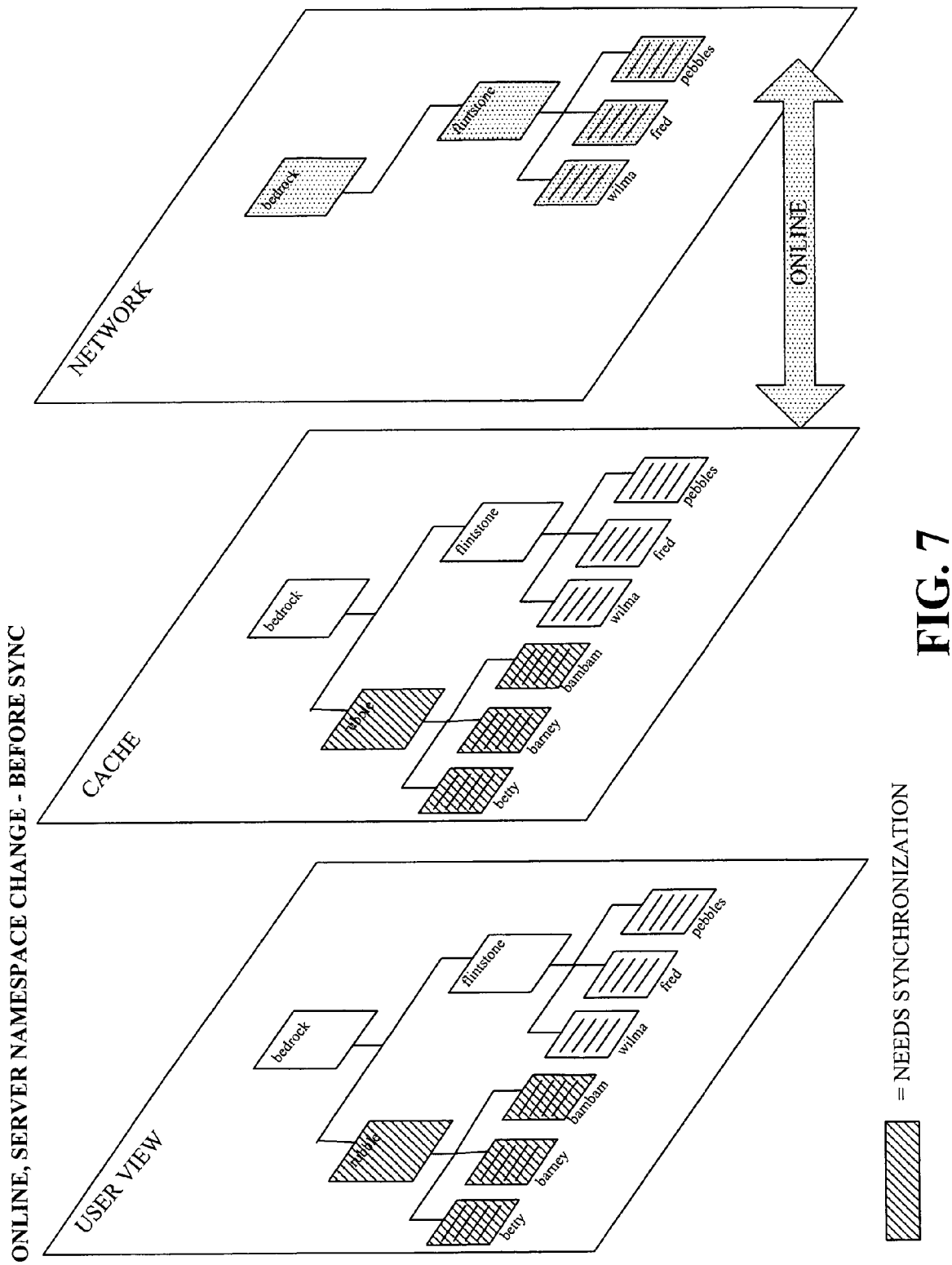
FIG. 7 illustrates an exemplary diagram of a user's view of an online, server namespace change requiring synchronization between the client and the server in accordance with one aspect of the present invention.

In case of conflicts, the local namespace overrides the remote namespace, so at all times, the applications and hence, the user see only additions of what they have not seen while offline, as shown in FIG. 7, infra.

Figure 8:
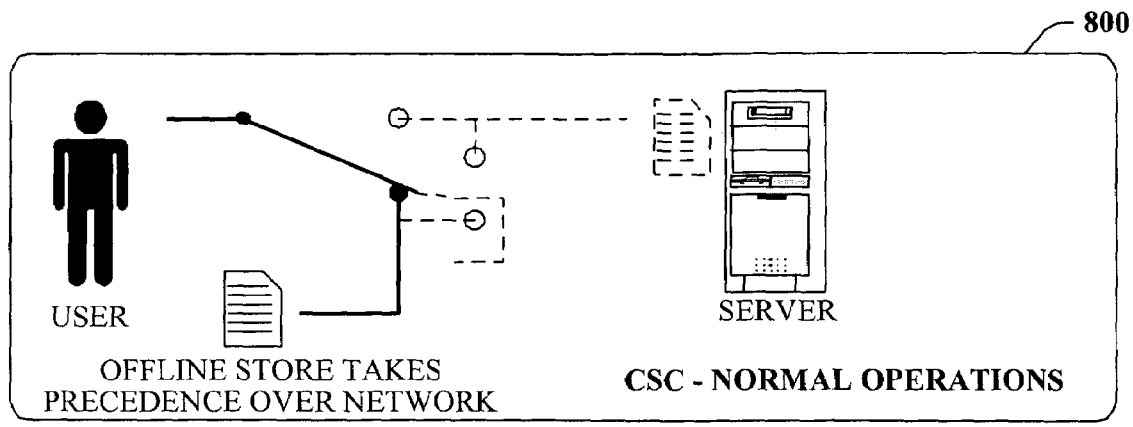
FIG. 8 illustrates an exemplary diagram of truth on the client during normal CSC operations in accordance with one aspect of the present invention.
Figure 9:
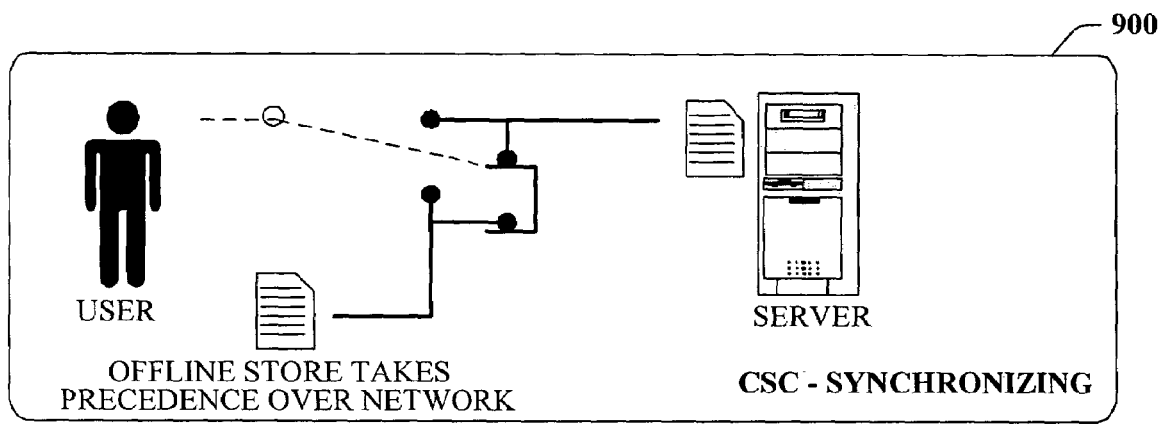
FIG. 9 illustrates an exemplary diagram of truth on the client during synchronization between client and server copies of a file object in accordance with one aspect of the present invention.
Figure 10:
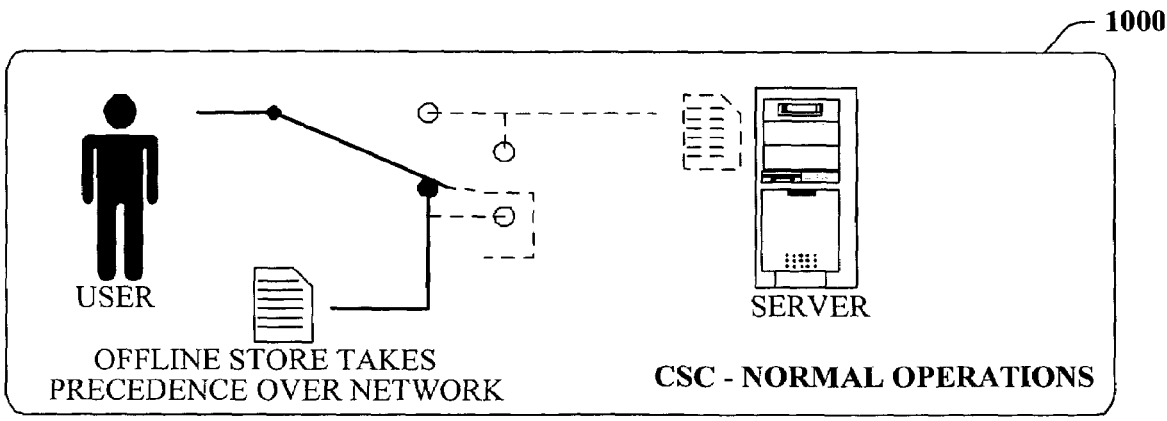
FIG. 10 illustrates an exemplary diagram of truth on the client as normal CSC operations have resumed in accordance with one aspect of the present invention.

Referring now to FIGS. 8-10, there are illustrate schematic diagrams that represent a sequence of points in time where a user is working on a cached document. They illustrate a sequence of points (e.g., diagrams 800, 900, and 1000) in time where a user is working on a cached document (FIG. 8), the document is synchronized (FIG. 9), and the user continues to work on the document (FIG. 10). The primary issue to observe is that, for cached content, the user is always working from the local cache, not directly from the associated server. A connection to the network can be required when that content must be synchronized with the associated server(s). Otherwise, the connection does not need to be maintained, thereby reducing bandwidth and network traffic. This is particularly true for snapshot-putback protocols such as WebDAV. For SMB, sharing semantics is maintained while online, by keeping handles open on the server, but not propagating any changes while the file is not being shared. Synchronization of offline content can occur automatically with user intervention required only to resolve synchronization conflicts. This results in a much less intrusive user experience for the present CSC user.

To ensure Offline Files properly handles all file and directory change scenarios, it can be important that an exemplary set of possible scenarios is understood. The first table (Table 1) illustrates 21 different "conditions" that a pair of files (server copy and cached copy) may exist in at the time of synchronization. Some may find the visual nature of this illustration helpful to understand and "visualize" the various conditions.

TABLE 1

| | Client | Server |
|---|---|---|
| 0. No changes | foo / ABC | foo / ABC |
| 1. File created on client. No server copy exists. | foo / ABC | |
| 2. Directory created on client. No server copy exists. | foo / [DIR] | |
| 3. File sparse on client. | foo / ABC | foo / ABC |
| 4. File renamed on server. | foo / ABC | foo / ABC → rename → bar / ABC |
| 5. Directory renamed on server. | foo / [DIR] | foo / [DIR] → rename → bar / [DIR] |
| 6. File deleted on server. | foo / ABC | foo / ABC → delete |
| 7. Directory deleted on server. | foo / [DIR] | foo / [DIR] → delete |
| 8. File created on client. Different file of same name exists on server. | foo / ABC | foo / XYZ |
| 9. Directory created on client. Different directory of same name exists on server. | foo / [DIR] | foo / [DIR'] |
| 10. File created on client. Directory of same name exists on server. | foo / ABC | foo / [DIR] |

TABLE 1-continued

| | Client | | | Server | | |
|---|---|---|---|---|---|---|
| 11. Directory created on client. File of same name exists on server. | foo [DIR] | | | foo ABC | | |
| 12. File renamed on client. | foo ABC | —rename→ | bar ABC | foo ABC | | |
| 13. Directory renamed on client. | foo [DIR] | —rename→ | bar [DIR] | foo [DIR] | | |
| 14. File deleted on client. | foo ABC | —delete→ | | foo ABC | | |
| 15. Directory deleted on client. | foo [DIR] | —delete→ | | foo [DIR] | | |
| 16. File changed on client. | foo ABC | —change→ | foo XYZ | foo ABC | | |
| 17. File changed on server. | foo ABC | | | foo ABC | —change→ | foo DEF |
| 18. File changed on client. File changed on server. | foo ABC | —change→ | foo XYZ | foo ABC | —change→ | foo DEF |
| 19. File changed on client. File deleted on server. | foo ABC | —change→ | foo XYZ | foo ABC | —delete→ | |
| 20. File deleted on client. File changed on server. | foo ABC | —delete→ | | foo ABC | —change→ | foo DEF |

Table 2 describes the behavior of the system for each of the 21 scenarios; first when the file or directory is not open and second, when the file or directory is open.

TABLE 2

| | | Offline->Online transition behavior | |
|---|---|---|---|
| | Occurred while offline | File/dir not open | File/dir open |
| 0 | No changes | Nothing | Handle kept open to cached file |
| 1 | File created on client. No server copy exists. | Copy file to server after online. | Handle kept open to cached file |
| 2 | Directory created on client. No server copy exists. | Create the directory on server after online. | Handle kept open to cached directory. |
| 3 | File sparse on client. | Copy file from server after online. | Not available. |
| 4 | File renamed on server. | Rename cached file after online. | Handle kept open to cached file. File is renamed after close. |
| 5 | Directory renamed on server. | Rename cached directory after online. | Handle kept open. Directory renamed after close. |

TABLE 2-continued

|  | | Offline->Online transition behavior | |
|---|---|---|---|
| Occurred while offline | | File/dir not open | File/dir open |
| 6 | File deleted on server. | Delete cached file after online. | Handle kept open to cached file. File is deleted after close. |
| 7 | Directory deleted on server. | Delete cached directory after online. | Handle kept open to cached directory. Directory is deleted after close. |
| 8 | File created on client. Different file of same name exists on server. | See cached file before resolve conflict. | Handle kept open to cached file. Conflict can be resolved after close. |
| 9 | Directory created on client. Different directory of same name exists on server. | See cached directory before resolve conflict. | Handle kept open to cached directory. Conflict can be resolved after close. |
| 10 | File created on client. Directory of same name exists on server. | See cached file before resolve conflict. | Handle kept open to cached file. Conflict can be resolved after close. |
| 11 | Directory created on client. File of same name exists on server. | See cached directory before resolve conflict. | Handle kept open to cached dir. Conflict can be resolved after close. |
| 12 | File renamed on client. | Rename server file after online. | Handle kept open to cached file while rename server file. |
| 13 | Directory renamed on client. | Rename server directory after online. | Handle kept open to cached directory while rename server directory. |
| 14 | File deleted on client. | Delete server file after online. | Not available. |
| 15 | Directory deleted on client. | Delete server directory after online. | Not available. |
| 16 | File changed on client. | Sync file after online. | Handle kept open to cached file while sync file. |
| 17 | File changed on server. | Sync file after online. | Handle kept open to cached file. Sync after close. |
| 18 | File changed on both client and server. | See cached file before resolve conflict. | Handle kept open to cached file. Conflict can be resolved after close. |
| 19 | File changed on client. Same file deleted on server. | See cached file before resolved conflict. | Handle kept open to cached file. File is deleted after close. |
| 20 | File deleted on client. Same file changed on server. | Hide file before resolve conflict. | Not available. |

TABLE 3

| No. | Silent | User | Description |
|---|---|---|---|
| 0 | x | | No changes. No action required. |
| 1 | x | | Silently copy file to server. |
| 2 | x | | Silently create directory on server. |
| 3 | x | | Silently fill sparse file on client |
| 4 | x | | Silently rename file in cache |
| 5 | x | | Silently rename directory in cache |
| 6 | | x | Delete file in cache. Prompt user to confirm deletion. What if cached file is the ONLY remaining copy? |
| 7 | | x | Delete directory in cache including all subfolders and files. Prompt user to confirm deletion. |
| 8 | | x | Resolve conflict |
| 9 | | x | Resolve conflict |
| 10 | | x | Resolve conflict |
| 11 | | x | Resolve conflict |
| 12 | x | | Silently rename file on server |
| 13 | x | | Silently rename directory on server |
| 14 | | x | Delete file on server. Prompt user to confirm deletion. |
| 15 | | x | Delete directory on server. Prompt user to confirm deletion. |
| 16 | x | | Silently copy file to server. |
| 17 | x | | Silently copy file to client |
| 18 | | x | Resolve conflict |
| 19 | | x | Resolve conflict |
| 20 | | x | Resolve conflict |

In order to properly operate in offline mode as described hereinabove, the CSC comprises an offline store which has two on-disk structures: the file system hierarchy and priority queue. The hierarchy is used to keep track of the remote entities we have cached and the name spaces there of. The priority queue is used for iterating over the entire offline store in an MRU or an LRU fashion. The design of the offline store may leverage as much of the local file system as possible in order to simplify the recovery logic in cases of a crash or data corruption.

In order to carry out the many aspects of the present invention as described hereinabove, several APIs can be employed. Below are exemplary APIs that are part of the user-mode components of CSC. The main goal of these APIs is to allow an operating system to manage the user experience in terms of online/offline states, synchronization, viewing the offline store and cache cleanup operations.

```
CSCIsCSCEnabled
BOOL
CSCIsCSCEnabled(
    VOID
);
```

This API allows an application to find out whether CSC is enabled at this time.

Parameters:
    None

Return Value:
    The function returns TRUE if successful; FALSE is returned if the function fails. GetLastError ( ) can be called to get extended information about the error.

```
CSCPinFile
BOOL
CSCPinFile (
    IN      LPTSTR      Name,               // Name of the item
    IN      DWORD       dwHintFlags,        // Flags to be Ored for pinning,
                                            // see FLAG_CSC_PIN_XXX
    OUT     LPDOWRD     lpdwStatus,         // Status of the item
    OUT     LPDWORD     lpdwResultingPinCount    // Pin count for this file
    OUT     LPDWORD     lpdwResultingHintFlags
);
```

This API allows an application to insert a file/directory in the Client-Side-Cache. If this API returns TRUE then the file is resident in the cache. If any of the pin flags are specified, the API takes the appropriate pinning action.

Parameters:
    Name: The fully qualified UNC name of the file or directory to be pinned into the client cache
    dwHintFlags These flags are hints to the CSC as to how to treat this entry. These flags are Or'ed with existing flags on the entry. If the entry is newly created because of this call, then these flags are the only flags on the entry
    lpdwStatus: The status of the file/folder as defined by the status flags
    lpdwResultingPinCount: Each file pinned in the CSC cache has a non-zero PinCount. Each call to CSCPinFile ( ) increments a file's PinCount by one, each call to CSCUnPinFile ( ) decrements the file's PinCount. ResultingPinCount returns the file's PinCount resulting from this call.
    lpdwResultingHintFlags: hint flags after this operation is successful Return Value:
    The function returns TRUE if successful; FALSE is returned if the function fails.
    GetLastError ( ) can be called to get extended information about the error.

```
CSCUnPinFile
BOOL
CSCUnPinFile (
    IN LPTSTR       Name,                   // Name of the file or directory
    IN DWORD        dwHintlagsMask,         // Bits to be removed from the entry
    OUT     LPDOWRD lpdwStatus,             // Status of the item
    OUT     LPDWORD lpdwResultingPinCount   // Pin count for this file
    OUT     LPDWORD lpdwResultingHintFlags
);
```

This API allows the caller to unpin a file or directory from the client side persistent cache.

Parameters:
    Name: The fully qualified UNC name of the item to be unpinned dwPinFlagMask: pin flags to remove from the entry. No error is reported if if flags to be removed aren't already there on the entry If one of the inherit flags is removed, the effect occurs On subsequently created descendents of that folder Descendents which got the a user/system pin count due to are unaffected.

lpdwStatus: The status of the file as defined by the status flags
    lpdwResultingPinCount: Each file pinned in the CSC cache has a non-zero PinCount. Each call to CSCPinFile ( )(increments a file's PinCount by one, each call to CSCUnPinFile ( ) decrements the file's PinCount. ResultingPinCount returns the file's PinCount resulting from this call. A file is no longer pinned to the CSC cache when ResultingPinCount is zero. lpdwResultinHintFlags: pin flags after this operation is successful.

Return Value:
    The function returns TRUE if successful. The status bits indicate more information about the item in the cache. FALSE is returned if the function fails. GetLastError( ) can be called to get extended information about the error.

```
CSCFindFirstCachedFile
HANDLE
CSCFindFirstCachedFile (
    LPCTSTR Name,
    OUT LPWIN32_FIND_DATA lpFindFileData,
    OUT LPDWORD   lpdwStatus,
    OUT LPDWORD   lpdwPinCount,
```

-continued

```
    OUT LPDWORD     lpdwHintFlags,
    OUT FILETIME        *lpftOrgTime
);
```

This API allows the caller to enumerate files in the client side cache.

Parameters:
  Name: Points to a null-terminated string that specifies a valid UNC name for a share. The API operates like the win32 FindFirstFile API, except that wild cards are not implemented in the first version.
    If a NULL parameter is passed in, the API begins enumeration of all the \\server\share entries in the client-side-cache.
  lpFindFileData: Points to the WIN32_FIND_DATA structure that receives information about the found file or directory. The structure can be used in subsequent calls to the CSCFindNextCachedFile or CSCFindClose function to refer to the file or subdirectory. The elements of the WIN32_FIND_DATA structure is filled in just as it would be for a non-cached file.
  lpdwStatus: if lpFindFileData is not NULL, this returns the status of the file in terms of the flags defined below.
    If lpFindFileData is NULL, it returns the status of the share as defined by FLAG_CSC_SHARE_STATUS_XXX.
  lpdwPinCount: Pin Count of the file
  lpftOrgTime: The timestamp of the original file on the server. This value makes sense only when the file/directory is a copy of a file on a server. It does not mean anything if the file/directory was created while offline, in which case the status bit FLAG_CSC_LOCALLY_CREATED is set.

```
CSCFindNextCachedFile
BOOL
CSCFindNextCachedFile (
    HANDLE hCSCFindHandle,
    LPWIN32_FIND_DATA lpFindFileData;
    OUT LPDWORD        lpdwStatus,
    OUT LPDWORD        lpdwPinCount,
    OUT LPDOWRD        lpdwHintFlags,
    OUT FILETIME       *lpftOrgTime
);
```

This function continues a cache file search from a previous call to the CSCFindFirstCachedFile function.

Parameters:
  hCSCFindHandle: identifies a search handle returned by a previous call to the CSCFindFirstCachedFile function.
  lpFindFileData: points to the WIN32_FIND_DATA structure that receives information about the found file or subdirectory. The structure can be used in subsequent calls to CSCFindNextCachedFile to refer to the found file or directory. The WIN32_FIND_DATA structure receives data as described in CSCFindFirstCachedFile.
  lpdwStatus: if the enumeration is for file/folder, this returns the status of the file in terms of the flags defined below.
    If the enumeration is for \\server\shares\ this returns the status of the share as defined by FLAG_CSC_SHARE_STATUS_XXX.
  lpdwPinCount: Pin Count of the file
  lpftOrgTime: The timestamp of the original file on the server. This value makes sense only when the file/directory is a copy of a file on a server. It does not mean anything if the file/directory was created while offline, in which case the status bit FLAG_CSC_LOCALLY_CREATED is set.

```
CSCFindClose
BOOL
CSCFindClose (
    HANDLE hCSCFindHandle
);
```

The CSCFindClose function closes the specified cache search handle. The CSCFindFirstCachedFile and CSCFindNextCachedFile functions use the search handle to locate cached files with names that match the given name.

Parameters:
  hCSCFindHandle: identifies the search handle. This handle must have been previously opened by the CSCFindFirstCachedFile function.

```
CSCFindFirstCachedFileForSid
HANDLE
CSCFindFirstCachedFile (
    LPCTSTR Name,
    PSID                pSid,
    OUT LPWIN32_FIND_DATA lpFindFileData,
    OUT LPDWORD         lpdwStatus,
    OUT LPDWORD         lpdwPinCount,
    OUT LPDWORD         lpdwHintFlags,
    OUT FILETIME        *lpftOrgTime
);
```

This API allows the caller to enumerate files in the client side cache for a particular principal, which is the only difference between this API and CSCFindFirstCachedFile. The handle returned by this API can be used by CSCFindNextCachedFile and CSCFindClose APIs.

Parameters:
  Name: Points to a null-terminated string that specifies a valid UNC name for a share. The API operates like the win32 FindFirstFile API, except that wild cards are not implemented in the first version. If a NULL parameter is passed in, the API begins enumeration of all the \\server\share entries in the client-side-cache.
  lpFindFileData: Points to the WIN32_FIND_DATA structure that receives information about the found file or directory. The structure can be used in subsequent calls to the CSCFindNextCachedFile or CSCFindClose function to refer to the file or subdirectory. The elements of the WIN32_FIND_DATA structure is filled in just as it would be for a non-cached file.
  pSid: Security ID of the principal for whom the cache is to be enumerated. If NULL, then guest is assumed
  lpdwStatus: if lpFindFileData is not NULL, this returns the status of the file in terms of the flags defined below.
    If lpFindFileData is NULL, it returns the status of the share as defined by FLAG_CSC_SHARE_STATUS_XXX.
  lpdwPinCount. Pin Count of the file
  lpftOrgTime: The timestamp of the original file on the server. This value makes sense only when the file/directory is a copy of a file on a server. It does not mean anything if the file/directory was created while offline, in which case the status bit FLAG_CSC_LOCALLY_CREATED is set.

```
CSCSetMaxSpace
BOOL
CSCSetMaxSpace(
    DWORD   nFileSizeHigh,
    DWORD   nFileSizeLow
)
```

Routine Description:
This routine allows the caller to set the maximum persistent cache size for files which are not pinned. It is used by the UI that allows the user to set the cache size. Maximum limit in Win2K/Windows XP is 2 GB.

Arguments:
nFileSizeLow Lower DWORD of the cachesize setting
nFileSizeHigh Higher DWORD of the cachesize setting Returns:
The function returns TRUE if successful; FALSE is returned on error and GetLastError ( ) can be called to get extended information about the error.

```
CSCDeleteCachedFile
BOOL
CSCDeleteCachedFile (
    IN LPTSTR   Name       // Name of the cached file
);
```

This API deletes the file from the client side cache.

Parameters:
Name: The fully qualified UNC name of the file to be deleted

Return Value:
The function returns TRUE if successful; FALSE is returned on error and GetLastError ( ) can be called to get extended information about the error. Notes: Example error cases are: a) If a directory is being deleted and it has descendents, then this call will fail b) If a file is in use, this call will fail. c) If the share on which this item exists is being merged, this call will fail.

```
CSCBeginSynchronization
BOOL
CSCBeginSynchronizationW(
    IN LPCTSTR   lpszShareName,
    LPDWORD      lpdwSpeed,
    LPDWORD      lpdwContext
)
```

This API sets up a synchronization context to begin the sync operation. Thus if user input is needed to synchronize a share, by calling this API, the input is obtained only once, and is reused to synchronize both inward and outward.

Arguments:

| | |
|---|---|
| lpszShareName | The name of the share to be synchronized |
| lpdwSpeed | A value returned by CSC to indicate to the caller, the underlying speed on which sync operation is being performed. This allows the synchronization UI to tailor its behavior according to the bandwidth |
| lpdwContext | A context returned by the API |

Returns:
TRUE if the function is successful, FALSE if some error was encountered, or the operation was aborted. GetLast Error( ) returns the errorcode.

```
CSCEndSynchronization
BOOL
CSCEndSynchronization(
    IN LPCTSTR   lpszShareName,
    DWORD        dwContext
)
```

This API cleans up the context obtained on a successful call to CSCBeginSynchronization API. The API cleans up any network connections established, possibly with user supplied credentials, during the CSCBeginSynchronization API.

Arguments:

| | |
|---|---|
| lpszShareName | Name of the share being synchronized |
| dwContext | Context obtained from the CSCBeginSynchronization API |

Returns:
TRUE if the function is successful, FALSE if some error was encountered, or the operation was aborted. GetLast Error( ) returns the errorcode.

```
CSCMergeShare
BOOL
CSCMergeShare(
    LPTSTR      lpszShareName,
    LPCSCPROC   lpfnMergeProgress
    DWORD       dwContext
)
```

This API allows the caller to initiate a merge of a share that may have been modified offline. The API maps a drive to the share that needs merging and uses that drive to do the merge. The mapped drive is reported in the callback at the beginning of the merge in the cFileName field of the lpFind32 parameter of the callback function. The caller of this API must a) use the drive letter supplied to do any operations on the net b) must do all the operations in the same thread that issues this API call.

Parameters:

| | |
|---|---|
| lpszShareName | Share to make changes. If this is NULL, all modified shares are merged |
| lpfnMergeProgress | Callback function that informs the caller about the progress of the merge. |
| dwContext | Context returned during callback |

Return:
TRUE if the function is successful, FALSE if some error was encountered, or the operation was aborted. GetLast Error( ) returns the errorcode.

```
CSCFillSparseFiles
    BOOL
    CSCFillSparseFiles(
        IN    LPTSTR       lpszName,
        IN    BOOL         fFullSync,
        IN    LPCSCPROC    lpprocFillProgress,
        IN    DWORD        dwContext
    );
```

Parameters:

| | |
|---|---|
| lpszName | Share or file name to sparsefill. |
| fFullSync | If TRUE, files which are not sparse are checked for staleness, and a fill attempted on them |
| lpprocCheckStatusProgress | Callback function that informs the caller about the progress of the status check |
| dwContext | Context returned during callback |

Return:

TRUE if the function is successful, FALSE if some error was encountered, or the operation was aborted. GetLast Error( ) returns the errorcode.

```
CSCCopyReplica
    BOOL
    CSCCopyReplica(
        IN     LPTSTR    lpszFullPath,
        OUT    LPTSTR    *lplpszLocalName
    )
```

This API allows the caller to copy the data for the replica of a remote item out of the CSC offline store into a temporary local file.

Parameters:

| | |
|---|---|
| lpszFullPath | Full path of the file that needs to be moved/copied |
| lplpszLocalName | pointer to a full qualified path of local file that contains the replica data. This is LocalAlloced by the API. It is the callers responsibility to free it. |

Return Value:

TRUE if successful, FALSE if failed. If FALSE, Get LastError( ) returns the exact error code.

```
CSCGetSpaceUsage
    BOOL
    CSCGetSpaceUsage(
        OUT    LPDWORD    lpnFileSizeHigh,
        OUT    LPDWORD    lpnFileSizeLow
    )
```

This API returns the current space consumption by unpinned data in the csc offline store.

Parameters:

| | |
|---|---|
| lpnFileSizeHigh | High dword of the total data size |
| lpfnFileSizeLow | Low dword of the total data size |

Return Value:

Returns TRUE if successful. If the return value is FALSE, GetLastError( ) returns the actual error code.

```
CSCFreeSpace
    BOOL
    CSCFreeSpace(
        DWORD    nFileSizeHigh,
        DWORD    nFileSizeLow
    )
```

This API frees up the space occupied by unpinned files in the CSC offline store by deleting them. The passed in parameters are used as a guide to how much space needs to be freed. Note that the API can delete local replicas only if they are not in use at the present time.

Parameters:

nFileSizeHigh High DWORD of the amount of space to be freed.

nFileSizeLow Low DWORD of the amount of space to be freed

Return Value:

Returns TRUE if successful. If the return value is FALSE, GetLastError( ) returns the actual error code.

```
CSCEnumForStats
BOOL
CSCMergeShare(
    LPTSTR       lpszShareName,
    LPCSCPROC    lpfnEnumProgress,
    DWORD        dwContext
)
```

This API allows the caller to enumerate a share or the entire CSC offline store to obtain salient statistics. It calls the callback function with CSC_REASON_BEGIN before beginning the enumeration, for each item it calls the callback with CSC_REASON_MORE_DATA and at the end of the callback, it calls it with CSC_REASON_END. For details of parameters with which the callback is made, see below.

Parameters:

| | |
|---|---|
| lpszShareName | Share to make changes. If this is NULL, all shares are enumerated. |
| lpfnEnumProgress | Callback function that informs the caller about the progress of the enumeration. The callback is invoked on every file/directory on that part of the share/database. The only significant parameters are dwStatus, dwHintFlags, dwPinCount, dwReason, dwParam1 and dwContext. If the item is a file, dwParam1 is 1, for directories, it is 0. |
| dwContext | Context returned during callback |

Return:
TRUE if the function is successful, FALSE if some error was encountered, or the operation was aborted. GetLast Error( ) returns the error code.

---

CSCDoLocalRename
BOOL
CSCDoLocalRename(
    IN LPCWSTR    lpszSource,
    IN LPCWSTR    lpszDestination,
    IN BOOL       fReplaceFileIfExists
)
/*++

---

This API does a rename in the offline store. The rename operation can be used to move a file or a directory tree from one place in the hierarchy to another. Its principal use at the present time is for folder redirection of MyDocuments share. If a directory is being moved and such a directory exists at the destination, the API tries to merge the two trees. If a destination file already exists, and fReplaceifExists parameter is TRUE, then an attempt is made to delete the destination file and put the source file in its place, else an error is returned.

Parameters:

---

| | |
|---|---|
| lpszSource | Fully qualified source name (must be UNC). This can be a file or any directory other than the root of a share. |
| lpszDestination | Fully qualified destination name (must be UNC). This can only be a directory. |
| fReplaceFileIfExists | replace destination file with the source if it exists. |

---

Returns:
TRUE if successful, FALSE otherwise. If the API fails, GetLastError returns the specific error code.

---

CSCDoEnableDisable
BOOL
CSCDoEnableDisable(
   BOOL fEnable
)

---

Routine Description:
This routine enables/disables CSC. It should be used only by the control panel applet. Enable CSC always succeeds. Disable CSC succeeds if there are no files or directories from the local offline store are open at the time of issuing this call.

Parameters:
fEnable enable CSC if TRUE, else disable CSC

Returns:
TRUE if successful, FALSE otherwise. If the API fails, GetLastError returns the specific error code.

---

CSCCheckShareOnline
BOOL
CSCCheckShareOnline(
    IN LPCWSTR    lpszShareName
)

---

Routine Description:
This routine checks whether a given share is available online.

Parameters:
lpszShareName

Returns:
TRUE if successful, FALSE otherwise. If the API fails, GetLastError returns the specific error code.

---

CSCTransitionServerOnline
BOOL
CSCTransitionServerOnline(
    IN LPCWSTR lpszShareName
)

---

Routine Description:
This routine transitions the server for the given share to online.

Arguments:
lpszShareName

Returns:
TRUE if successful, FALSE if a failure occurs. On error, GetLastError is used to obtain the actual error code.

---

CSCEncryptDecryptDatabase
BOOL
CSCEncryptDecryptDatabase(
    IN BOOL       fEncrypt,
    IN LPCSCPROCW lpfnEnumProgress,
    IN DWORD_PTR  dwContext
)

---

Routine Description:
This routine is used to encrypt/decrypt the entire offline store in system context. The routine checks that the CSC offline store is hosted on a file system that allows encryption. Only admins can do the conversion.

Arguments:

| | |
|---|---|
| fEncrypt | if TRUE, we encrypt the offline store else we decrypt. |
| LPCSCPROCW | call back proc. The usual set of CSCPROC_REASON_BEGIN, CSCPROC_REASON_MORE_DATA, CSC_PROC_END are sent when the conversion actually begins. Conversion can fail if a file is open or for some other reason, in which case the second to last parameter in the callback with CSCPROC_REASON_MORE_DATA has the error code. The third to last parameter indicates whether the conversion was complete or not. Incomplete conversion is not an error condition. |
| dwContext | callback context |

Returns:
  TRUE if no errors encountered.

Notes:
  Theory of operations:
    The CSC offline store encryption code encrypts all the inodes represented by remote files.
  Who: Only user in admingroup can do encryption/decryption. This is checked in kernel.
  Which context: Files are encrypted in system context. This allows files to be shared while still being encrypted. This solution protects from a stolen laptop case.
  The offline store can have the following status set on it based on the four encryption states:
  a) FLAG_DATABASESTATUS_UNENCRYPTED
  b) FLAG_DATABASESTATUS_PARTIALLY_UNENCRYPTED
  c) FLAG_DATABASESTATUS_ENCRYPTED
  d) FLAG_DATABASESTATUS_PARTIALLY_ENCRYPTED In states a) and b), new files are created unencrypted. In states c) and d), new files are created encrypted.

At the beginning of the conversion, the offline store stats are marked to the appropriate XX_PARTIAL_XX state. At the end, if all goes well, it is transitioned to the final state.

At the time of enabling CSC, if the offline store state is XX_PARTIAL_XX, the kernel code tries to complete the conversion to the appropriate final state.

```
LPCSCPROC
DWORD    (*LPCSCPROC)(
    LPTSTR          lpszName,
    DWORD           dwStatus,
    DWORD           dwHintFlags,
    DWORD           dwPinCount,
    WIN32_FIND_DATA *lpFind32,
    DWORD           dwReason,
    DWORD           dwParam1,
    DWORD           dwParam2,
    DWORD           dwContext
)
```

Parameters:

Return Value:
  See CSCPROC_RETURN_xxx.

File/Folder Status Bit Definitions:
  FLAG_CSC_COPY_STATUS_DATA_LOCALLY_MODIFIED
  FLAG_CSC_COPY_STATUS_ATTRIB_LOCALLY_MODIFIED
  FLAG_CSC_COPY_STATUS_TIME_LOCALLY_MODIFIED
  FLAG_CSC_COPY_STATUS_STALE
  FLAG_CSC_COPY_STATUS_LOCALLY_DELETED
  FLAG_CSC_COPY_STATUS_SPARSE
  FLAG_CSC_COPY_STATUS_ORPHAN
  FLAG_CSC_COPY_STATUS_SUSPECT
  FLAG_CSC_COPY_STATUS_LOCALLY_CREATED
  FLAG_CSC_USER_ACCESS_MASK
  FLAG_CSC_GUEST_ACCESS_MASK
  FLAG_CSC_OTHER_ACCESS_MASK Share Status Bit Definitions: (Read only)
  FLAG_CSC_SHARE_STATUS_MODIFIED_OFFLINE
  FLAG_CSC_SHARE_STATUS_CONNECTED
  FLAG_CSC_SHARE_STATUS_FILES_OPEN
  FLAG_CSC_SHARE_STATUS_FINDS_IN_PROGRESS
  FLAG_CSC_SHARE_STATUS_DISCONNECTED_OP
  FLAG_CSC_SHARE_MERGING

| | |
|---|---|
| lpszName | fully qualified UNC path |
| dwStatus | status of the entry (see FLAG_CSC_COPY_STATUS_xxx) |
| dwHintFlags | hint flags on the entry (see FLAG_CSC_HINT_xxx) |
| dwPinCount | pin count of the entry |
| lpFind32 | WIN32_FIND_DATA_STRUCTURE of the local copy in the offline store. This may be NULL if the callback is CSC_REASON_BEGIN and CSC_REASON_END for a share. During merging this parameter will be non-NULL for CSC_REASON_BEGIN. The cFileName member of this structure will contain the mapped drive letter to the share, through which all net access should be performed. |
| dwReason | callback reason (see CSCPROC_REASON_xxx) |
| dwParam1 | contents dependent on dwReason above CSCPROC_REASON_BEGIN: If merging is in progress a no-zero value of this parameter indicates that this item conflicts with the remote item. CSCPROC_REASON_MORE_DATA: contains the low order dword of the amount of the amount of data transferred |
| dwParam2 | contents dependent on dwReason above CSCPROC_REASON_MORE_DATA: contains the high order dword of the amount of the amount of data transferred CSCPROC_REASON_END: contains error codes as defined in winerror.h. If it is ERROR_SUCCESS, then the operation that was started with the CSCPROC_REASON_BEGIN completed successfully. |
| dwContext | context passed in by the caller while calling the API |

Hint Flags Definitions:

| | |
|---|---|
| FLAG_CSC_HINT_PIN_USER | When this bit is set, the item is being pinned for the user. Note that there is only one pincount allotted for user. |
| FLAG_CSC_HINT_PIN_INHERIT_USER | When this flag is set on a folder, all descendents subsequently created in this folder get pinned for the user. |
| FLAG_CSC_HINT_PIN_INHERIT_SYSTEM | When this flag is set on a folder, all descendents subsequently created in this folder get pinned for the system. |
| FLAG_CSC_HINT_CONSERVE_BANDWIDTH | When this flag is set on a folder, for executables and other related file, CSC tries to conserver bandwidth by not flowing opens when these files are fully cached. |

CSC callback function related definitions:
Definitions for callback reason:
CSCPROC_REASON_BEGIN
CSCPROC_REASON_MORE_DATA
CSCPROC_REASON_END Definitions for callback return values:
CSCPROC_RETURN_CONTINUE
CSCPROC_RETURN_SKIP
CSCPROC_RETURN_ABORT
CSCPROC_RETURN_FORCE_INWARD //applies only while merging
CSCPROC_RETURN_FORCE_OUTWARD //applies only while merging The following APIs are available to manage the CSC settings for an SMB shares for Win2K and beyond.

NetShareSetInfo
This API is used to set the CSC attributes of a server share.

```
NET_API_STATUS
NetShareSetInfo (
    LPTSTR servername,
    LPTSTR sharename,
    DWORD level
    LPBYTE buf
    LPDWORD parm_err
);
```

Parameters:
   Servername: Pointer to a Unicode string containing the name of the remote server on which the function is to execute. A NULL pointer or string specifies the local computer.
   ShareName. Pointer to a Unicode string containing the network name of the share to set information on.
   Level: Has value 1007, indicating that the buf parameter points to a SHARE_INFO_1007 structure (below)

NetShareGetInfo
This API is used to get the CSC attributes of a server share.

```
NET_API_STATUS
NetShareGetInfo (
    LPTSTR servername,
    LPTSTR sharename,
    DWORD level,
    LPBYTE *bufptr,
);
```

Parameters:
   Servername: Pointer to a Unicode string containing the name of the remote server on which the function is to execute. A NULL pointer or string specifies the local computer.
   Sharename: Pointer to a Unicode string containing the network name of the share to get information on.
   Level: Has value 1007, indicating that level 1007 information should be returned, and bufptr should be set to point to resulting SHARE_INFO_1007 structure. Bufptr should be freed with NetApiBufferFree ( ) when no longer needed.

SHARE_INFO_1007

```
Typedef struct _SHARE_INFO_1007 {
    DWORD shi1007_flags;
    LPTSTR shi1007_AlternateDirectoryName;
} SHARE_INFO_1007, *PSHARE_INFO_1007,
*LPSHARE_INFO_1007;
```

Shi1007_flags:
   CSC_CACHEABLE indicates that the client can safely cache files on this directory for off-line access
   CSC_NOFLOWOPS indicates that the client need not send opens or other operations to the server when accessing its locally cached copies of files in this share
   CSC_AUTO_INWARD indicates that files changed on the server should automatically replace cached copies on the client
   CSC_AUTO_OUTWARD indicates that files cached on the client should automatically replace copies on the server
   AlternateDirectoryName
   If set, this is the name of the alternate directory where COW files should be written. See the (to be written) COW specification for details.

Various methodologies in accordance with the subject invention will now be described via a series of acts. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Turning now to FIGS. 11-14, there are illustrated flow diagrams of exemplary methodologies that facilitate supporting connection state transitions at the directory level (e.g., DFS link) and partial name space offline in accordance with an aspect of the present invention.

Figure 11:
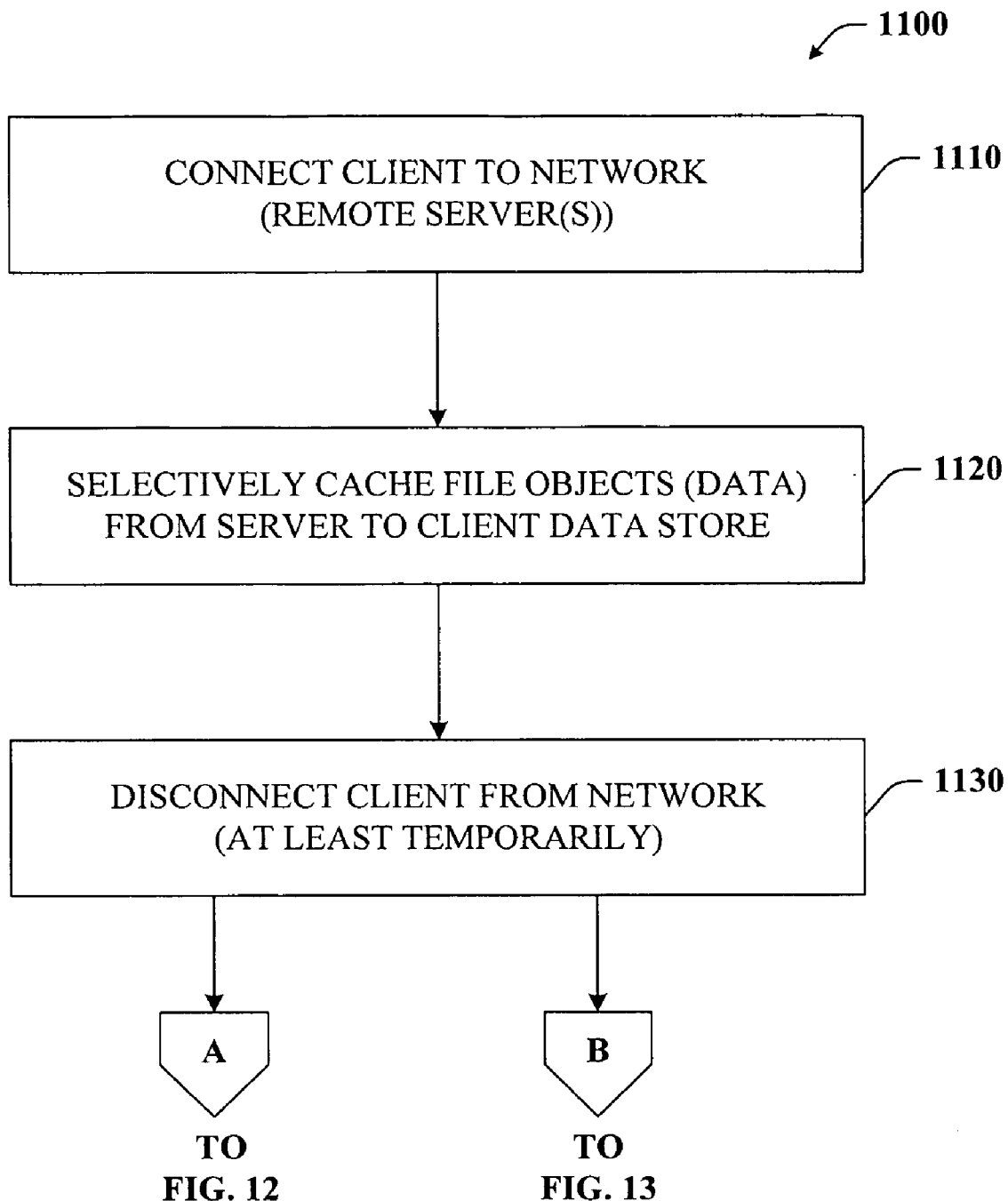
FIG. 11 illustrates a flow diagram of an exemplary methodology that facilitates maintaining access to remote files (e.g., server-based) during any period of disconnect from a remote location in accordance with one aspect of the present invention.

FIG. 11 depicts a process 1100 that facilitates maintaining access to remote files (e.g., server-based) during any period of disconnect from the server or network. In particular, a client can be connected to a network or remote server(s) at 1110. While connected to the network, one or more file objects, directories, and/or any other data files can be selectively cached to the client's local database or data store (e.g., memory) at 1120. The selective caching can be based at least in part upon user preferences. For example, file objects that have been accessed while online can be cached to the client's hard drive. Alternatively or in addition, the client can infer which file objects are more likely to be desired for caching based on the user's current online activity. Such file objects can include those files that have been accessed as well as other files that are related thereto. This can be determined in part by file location (e.g., related directory), metadata associated with the respective files, past client behavior (e.g., files were accessed at a similar time in the past), and the like. Selective caching can also be facilitated by learning and/or employing training systems and techniques by the client or end-user.

In addition to the file objects, properties associated with the respective file objects can also be cached to facilitate security measures, for example. This includes the object access rights, share access rights and the pertinent DFS link. Moreover, directory rights can be cached and physical share cache configurations at the DFS link are honored in accordance with an aspect of the present invention. Cache configurations include manual caching and auto caching. For instance, if the physical share is set to be no caching, the files under the part of the logical namespace hosted on the physical share will not be cached.

Figure 12:
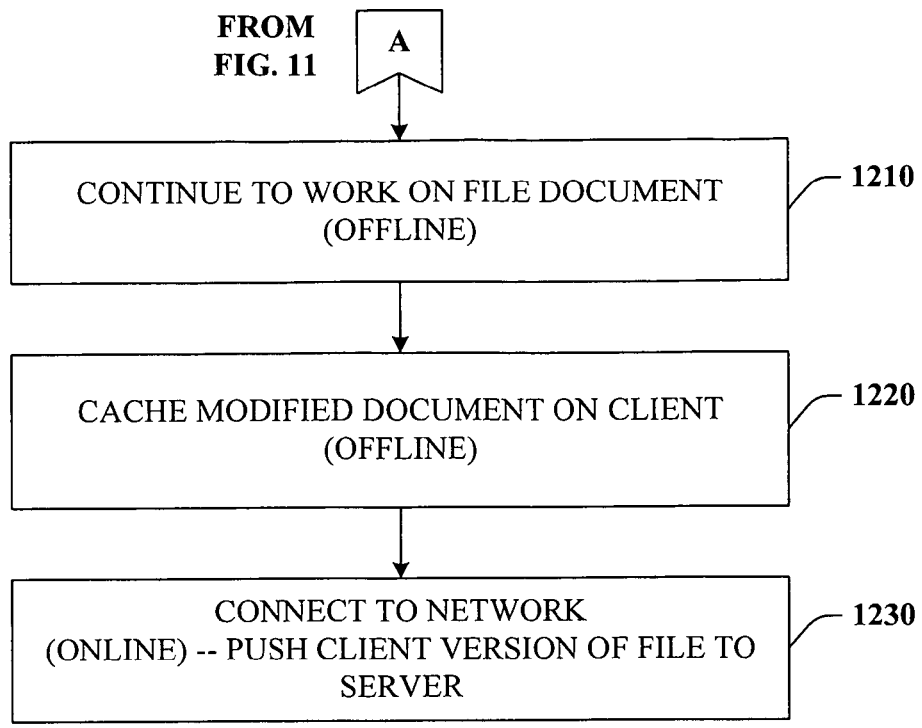
FIG. 12 is a continuation of FIG. 11, in accordance with one aspect of the present invention.

At 1130, the client can be disconnected from the server either intentionally or unintentionally. When disconnected from the server, the client, or the user, can continue to work on the file as illustrated in FIG. 12, infra, at 1210. In fact, the user may not even be aware that the connection to the network has been lost because file and/or directory access has not been interrupted. That is, despite the state transition from online to offline, the client can still perform computer operations with respect to remote-based files and directories as if it were connected to the remote server.

At 1220, any modifications or changes to the document can be saved or stored in the local cache on the client. When the connection to the server resumes, the client version of the file can be pushed to the server if no conflict exists between the client's version and the server version.

In practice, for example, when an open request is sent to a client side caching (CSC) component, it detects whether the file is in conflict with the server version. If a conflict is detected, the caching component satisfies the request with only the local handle and subsequent file I/O operations are performed on the local cache. This feature facilitates deferred synchronization of the files in the background after the path is transitioned online since users continue to see the file that he/she has been working on during the offline period. Therefore, the particular file is operated in offline state while the path is still online. However, if no conflict occurs between the local and server copies, the request can be sent to the server and handled in a manner in accordance with the present invention. It should be appreciated that the client maintains a persistent cache, which must be flushed out to the server before the handle closes. This ensures that the existing file semantics continue to work.

Figure 13:
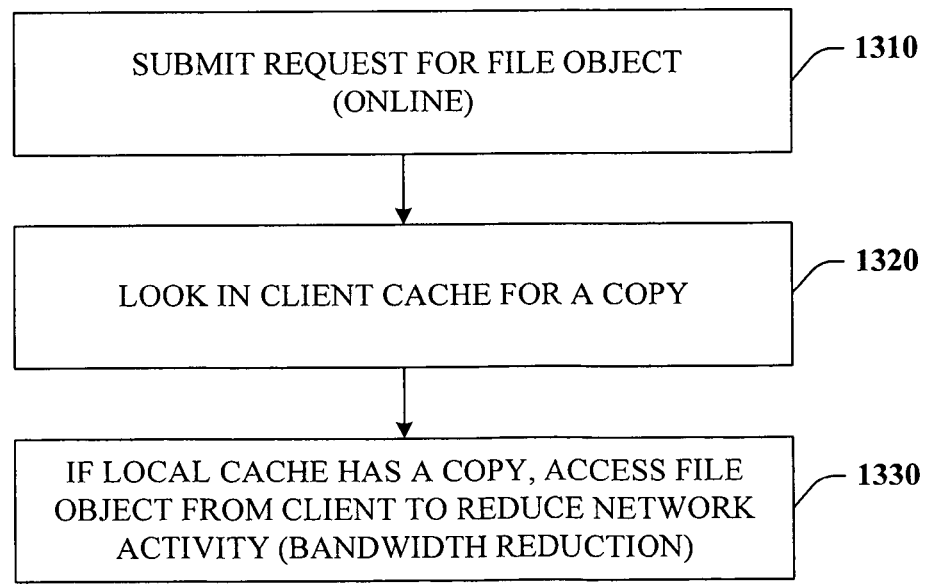
FIG. 13 is a continuation of FIG. 11, in accordance with one aspect of the present invention.

FIG. 13 illustrates a method that facilitates bandwidth reduction and/or conservation in accordance with an aspect of the present invention. At 1310, a request can be submitted for a file object, for example. Instead of querying the server, the client cache is searched. If the file object is found in the client cache, then the client cache can satisfy the request. Thus, the server is not accessed and network traffic is mitigated. When a connection is slow, this method also facilitates conserving the available bandwidth for instances where only the server can fulfill the request(s). It should be appreciated that the client version overrides the server version in instances of conflict and availability. That is, the client version can be used to satisfy requests even if the server has the same copy unbeknownst to the user or client since any file accessed from the client cache will appear as if it came from the server, regardless of the connection state.

Figure 14:
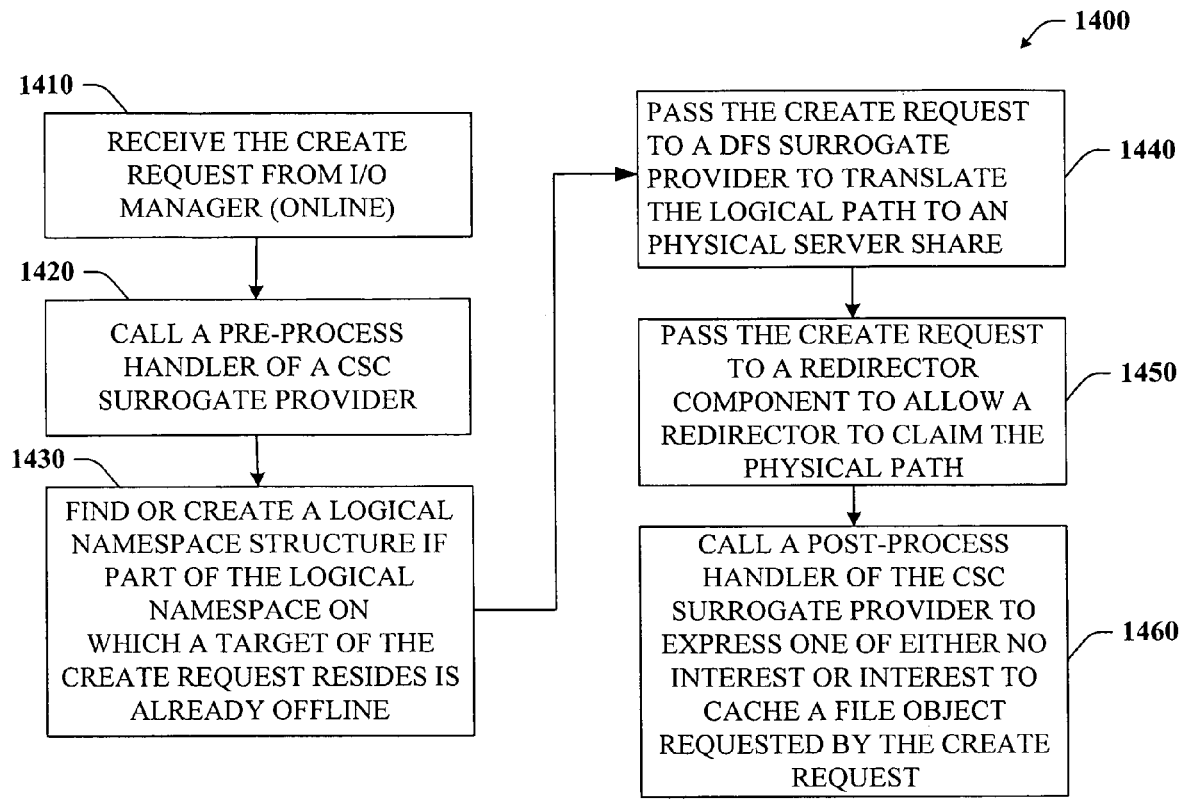
FIG. 14 illustrates an exemplary API in accordance with one aspect of the present invention.
Figure 15:
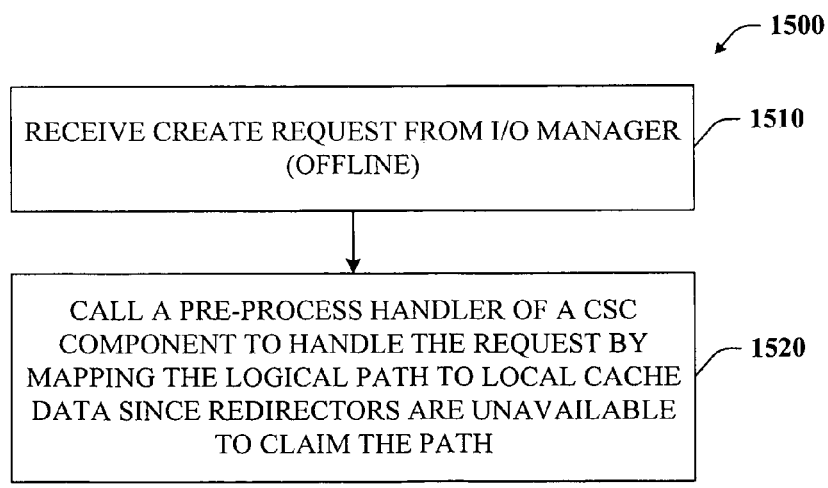
FIG. 15 illustrates an exemplary API in accordance with one aspect of the present invention.

Referring now to FIGS. 14 and 15, there are illustrated exemplary APIs for create requests submitted while online with a remote location and offline with a remote location, respectively. As shown in FIG. 14, the API 1400 involves receiving the create request from an I/O manager at 1410. At 1420, a pre-process handler of a CSC surrogate provider is called. Following therefrom at 1430, the CSC surrogate provider finds or creates a logical namespace structure if part of the logical namespace on which a target of the create request resides is already offline. At 1440, the create request is passed to a DFS surrogate provider to translate the logical path to a physical server share. At 1450, the create request is passed to a redirector component (e.g., RDBSS) to allow a particular redirector (e.g., SMB, Webdav, NFS) claim the physical path. At 1460, a post-process handler of the CSC surrogate provider can be called again to express one of either no interest or interest to cache a file object requested by the create request.

The API 1500 shown in FIG. 15 involves receiving the create request from an I/O manager at 1510 and calling a pre-process handler of a CSC surrogate provider to handle the request by mapping the logical path to local cache data since redirectors are unavailable to claim the path at 1520. With respect to FIG. 15, the CSC surrogate provider handles the request since the DFS component and redirectors are not available to the CSC when offline or disconnected from the remote location.

Figure 16:
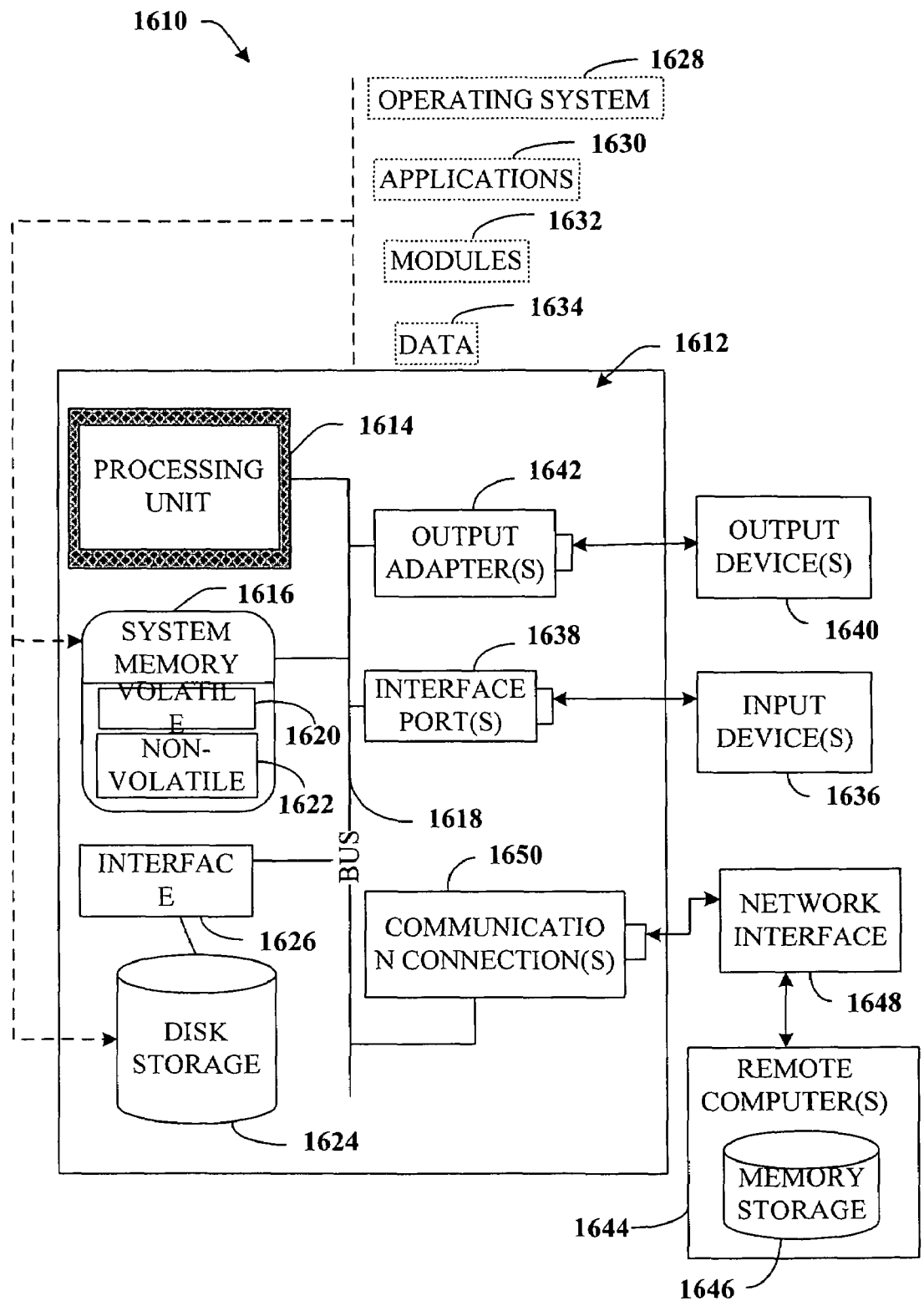
FIG. 16 illustrates an exemplary operating system in accordance with one aspect of the present invention.

In order to provide additional context for various aspects of the present invention, FIG. 16 and the following discussion are intended to provide a brief, general description of a suitable operating environment 1610 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1610 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 16, an exemplary environment 1610 for implementing various aspects of the invention includes a computer 1612. The computer 1612 includes a processing unit 1614, a system memory 1616, and a system bus 1618. The system bus 1618 couples the system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/nonremovable, volatile/nonvolatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the present invention can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapter 1642 is provided to illustrate that there are some output devices 1640 like monitors, speakers, and printers among other output devices 1640 that require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method performed by a client computing system including one or more processors and system memory that facilitates satisfying a create request on an online remote file system, the method comprising:
   receiving the create request from an I/O manager, the create request indicating a request to create a file in a first directory on the remote file system, the first directory being a subdirectory of a larger second directory on the remote file system;
   calling a pre-process handler of a client side caching (CSC) surrogate provider;
   finding or creating a logical namespace structure if part of the logical namespace on which a target of the create request resides is already offline;
   passing the create request to a Distributed File System (DFS) surrogate provider to translate the logical namespace to an physical server share;
   passing the create request to a redirector component to allow a redirector to claim the physical path;
   calling a post-process handler of the CSC surrogate provider to express an interest to cache a copy of the file indicated by the request; and
   in response to the post-process handler of the CSC expressing an interest to cache a copy of the file indicated by the request, partially caching the larger second directory by caching a copy of the first directory and the contents of the first directory as a whole on the client computing system without caching other subdirectories of the larger second directory.

2. The method as in claim 1, further comprising:
   displaying, on a display device of the client computing system, a first view of the larger second directory including the first directory and the other subdirectories; and
   in response to the remote file system going offline, displaying, on the display device of the client computing system, a partial view of the larger second directory that includes the first directory without the other subdirectories.

3. The method as in claim 1, wherein I/O manager receives the create request via a kernel of the operating system of the client computing system.

4. A method performed by a client computer including one or more processors and system memory that facilitates satisfying a create request on the client computer when disconnected from a remote file system, the method comprising:
   receiving the create request from an I/O manager, the create request indicating a request to create a file in a first directory on the remote file system, the first directory being a subdirectory of a larger second directory on the remote file system;
   calling a pre-process handler of a client side caching (CSC) surrogate provider to handle the request by mapping the logical path to local cache data on the client computer since redirectors are unavailable to claim the path; and
   caching a copy of the file on the client computer, the client computer including a cached copy of the first directory and the contents of the first directory as a whole, wherein the larger second directory is partially cached on the client computer such that other subdirectories of the larger secondary are not cached on the client computer.

5. The method as in claim 4, further comprising:
   displaying, on a display device of the client computer, a partial view of the larger second directory that includes the first directory without the other subdirectories; and
   in response to the client computer connecting to the remote file system, displaying, on the display device of the client computing system, a view of the larger second directory including the first directory and the other subdirectories.

6. The method as in claim 4, wherein I/O manager receives the create request via a kernel of the operating system of the client computer.

7. A computer readable medium having stored thereon computer-executable components that perform a method that facilitates satisfying a create request on a client computer when disconnected from a remote file system, the client computer including one or more processors and system memory, the method comprising:
   receiving the create request from an I/O manager, the create request indicating a request to create a file in a first directory on the remote file system, the first directory being a subdirectory of a larger second directory on the remote file system;
   calling a pre-process handler of a client side caching (CSC) surrogate provider to handle the request by mapping the logical path to local cache data on the client computer since redirectors are unavailable to claim the path; and
   caching a copy of the file on the client computer, the client computer including a cached copy of the first directory and the contents of the first directory as a whole, wherein the larger second directory is partially cached on the client computer such that other subdirectories of the larger secondary are not cached on the client computer.

8. The computer readable medium as in claim 7, wherein the method further comprises:
   displaying, on a display device of the client computer, a partial view of the larger second directory that includes the first directory without the other subdirectories; and
   in response to the client computer connecting to the remote file system, displaying, on the display device of the client computing system, a view of the larger second directory including the first directory and the other subdirectories.

9. The computer readable medium as in claim 7, wherein I/O manager is configured to receive the create request via a kernel of the operating system of the client computer.

* * * * *